US011042852B1

(12) United States Patent
Wadhwa

(10) Patent No.: US 11,042,852 B1
(45) Date of Patent: Jun. 22, 2021

(54) SENDER AUTHENTICATED REMITTANCE VIA AN AUTOMATIC TELLER MACHINE

(71) Applicant: Wells Fargo Bank, N.A., San Francisco, CA (US)

(72) Inventor: Gaurav Wadhwa, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 289 days.

(21) Appl. No.: 15/632,007

(22) Filed: Jun. 23, 2017

(51) Int. Cl.
*G06Q 20/10* (2012.01)
*G06Q 20/40* (2012.01)

(52) U.S. Cl.
CPC ... *G06Q 20/1085* (2013.01); *G06Q 20/40145* (2013.01); *G06Q 20/10* (2013.01); *G06Q 20/40* (2013.01)

(58) Field of Classification Search
CPC .... G06Q 40/00; G06Q 20/10; G06Q 20/1085; G06Q 20/40145
USPC .............................................. 705/39, 40, 43
See application file for complete search history.

(56) References Cited

U.S. PATENT DOCUMENTS

| | | | |
|---|---|---|---|
| 7,686,211 B2 | 3/2010 | Smith et al. | |
| 7,686,213 B1* | 3/2010 | Ramachandran .... | G06Q 20/042 235/379 |
| 7,922,080 B1* | 4/2011 | Doland ................... | G07F 19/20 235/379 |
| 8,073,770 B2* | 12/2011 | Cole ....................... | G06Q 20/10 705/39 |
| 8,459,546 B1* | 6/2013 | Block ..................... | G06Q 20/18 235/379 |
| 8,494,956 B2* | 7/2013 | Tulluri ................... | G06Q 20/10 705/39 |
| 8,632,000 B2* | 1/2014 | Laracey ............. | G06Q 20/3276 235/379 |
| 8,640,946 B1* | 2/2014 | Block ................ | G06Q 20/1085 235/379 |

(Continued)

OTHER PUBLICATIONS

Medhi et al. "A Comparison of Mobile Money-Transfer UIs for Non-Literate and Semi-Literate Users" CHI 2009, Mobile Applications for the Developing World. Boston, MA, USA. Apr. 8, 2009. (C) ACM. (Year: 2009).*

(Continued)

*Primary Examiner* — Narayanswamy Subramanian
*Assistant Examiner* — Ayal I. Sharon
(74) *Attorney, Agent, or Firm* — Shumaker & Sieffert, P.A.

(57) ABSTRACT

Techniques are described for sender authenticated remittance via an automatic teller machine (ATM). The techniques include transferring money between a sender and a recipient via the ATM without the recipient needing a computing device or a bank account with which to receive the money. The disclosed techniques enable a remittance server to interact with both the sender via a sender computing device and the recipient via the ATM to perform a money transfer in which the recipient is at least partially authenticated by the sender. The ATM is configured to take a picture or a video of the recipient to be sent by the remittance server to the sender computing device for approval by the sender prior to allocating the transferred money to the recipient. In this way, the remittance server essentially passes control of the ATM and the remittance of the transferred money to the sender.

21 Claims, 7 Drawing Sheets

(56) References Cited

U.S. PATENT DOCUMENTS

| | | | | |
|---|---|---|---|---|
| 8,676,708 B1* | 3/2014 | Honey | G06Q 40/02 | 705/44 |
| 8,793,187 B2* | 7/2014 | Alvarez | G06Q 20/1085 | 705/39 |
| 8,941,709 B2* | 1/2015 | Johnson | G06Q 20/18 | 348/14.01 |
| 9,292,840 B1* | 3/2016 | Velline | G06Q 30/0226 | |
| 9,412,106 B2 | 8/2016 | Laracey | | |
| 9,659,294 B2* | 5/2017 | Laracey | G07F 19/20 | |
| 10,108,959 B2* | 10/2018 | Wolfs | G06Q 20/20 | |
| 2003/0080185 A1* | 5/2003 | Werther | G07F 19/20 | 235/380 |
| 2004/0024709 A1* | 2/2004 | Yu | G06Q 20/105 | 705/43 |
| 2004/0226992 A1* | 11/2004 | Imanishi | G06Q 20/341 | 235/379 |
| 2005/0065876 A1 | 3/2005 | Kumar | | |
| 2006/0006224 A1* | 1/2006 | Modi | G06Q 20/02 | 235/379 |
| 2006/0287953 A1* | 12/2006 | Chauhan | G06Q 20/10 | 705/39 |
| 2007/0050291 A1* | 3/2007 | Avazian | G06Q 20/04 | 705/42 |
| 2007/0155418 A1* | 7/2007 | Shau | H04M 1/66 | 455/550.1 |
| 2007/0295805 A1* | 12/2007 | Ramachandran | G06Q 20/108 | 235/379 |
| 2008/0189209 A1* | 8/2008 | Loomis | G07F 19/20 | 705/44 |
| 2008/0210751 A1* | 9/2008 | Kim | G06Q 40/02 | 235/379 |
| 2009/0070257 A1* | 3/2009 | Csoka | G06Q 20/10 | 705/39 |
| 2009/0070263 A1* | 3/2009 | Davis | G06Q 20/322 | 705/44 |
| 2009/0094163 A1* | 4/2009 | Shastry | G06Q 20/04 | 705/64 |
| 2010/0044430 A1* | 2/2010 | Song | G06Q 20/04 | 235/379 |
| 2010/0332390 A1* | 12/2010 | Paintin | G06Q 20/10 | 705/44 |
| 2011/0029428 A1* | 2/2011 | Song | G06Q 20/10 | 705/39 |
| 2012/0016799 A1* | 1/2012 | Killian | G06Q 20/20 | 705/44 |
| 2012/0197797 A1* | 8/2012 | Grigg | G07F 19/20 | 705/43 |
| 2012/0197798 A1* | 8/2012 | Grigg | G06Q 20/1085 | 705/43 |
| 2012/0265809 A1* | 10/2012 | Hanson | H04L 67/141 | 709/204 |
| 2013/0048714 A1* | 2/2013 | Sharma | G06Q 20/346 | 235/379 |
| 2013/0054468 A1 | 2/2013 | Fuentes et al. | | |
| 2013/0110668 A1* | 5/2013 | Hart | G06Q 30/00 | 705/26.5 |
| 2013/0339235 A1 | 12/2013 | Tulluri et al. | | |
| 2014/0089188 A1* | 3/2014 | Rao | G06Q 20/108 | 705/43 |
| 2014/0214677 A1* | 7/2014 | Hagmeier | G06Q 20/10 | 705/44 |
| 2014/0222671 A1* | 8/2014 | Elias | G06Q 20/3223 | 705/42 |
| 2014/0263618 A1 | 9/2014 | McCarthy et al. | | |
| 2014/0324689 A1* | 10/2014 | Pinault | G06Q 20/3223 | 705/41 |
| 2015/0058216 A1 | 2/2015 | Luciani | | |
| 2016/0012465 A1* | 1/2016 | Sharp | G06Q 20/18 | 705/14.17 |
| 2016/0078417 A1* | 3/2016 | DeLuca | G01S 5/02 | 701/23 |
| 2016/0086143 A1* | 3/2016 | Hao | G06Q 20/1085 | 705/43 |
| 2016/0098700 A1* | 4/2016 | Johnson | G07F 19/20 | 705/43 |
| 2016/0104132 A1* | 4/2016 | Abbatiello | G06Q 20/10 | 705/39 |
| 2016/0104133 A1* | 4/2016 | Davis | G06Q 50/01 | 705/39 |
| 2016/0104159 A1* | 4/2016 | Butterfield | G06Q 20/384 | 705/44 |
| 2017/0006009 A1* | 1/2017 | Hessler | G06F 21/10 | |
| 2017/0200158 A1* | 7/2017 | Honey | G06Q 20/24 | |
| 2017/0213199 A1* | 7/2017 | Schwartz | G07D 11/00 | |
| 2017/0243181 A1* | 8/2017 | Tyma | G06Q 20/108 | |

OTHER PUBLICATIONS

Ayo et al. "Framework for Mobile Money Implementation in Nigeria". IBIMA Publishing. Journal of African Research in Business & Technology. vol. 2011 (2011), Article ID 117860, 8 pages. Copyright © 2011. DOI: 10.5171/2011.117860 (Year: 2011).*

Albahbooh et al. "A Mobile Phone Device as a Biometrics Authentication Method for an ATM Terminal". 2015 IEEE International Conference on Computer and Information Technology. 978-1-5090-0154-5/15. © 2015 IEEE DOI 10.1109/CIT/IUCC/DASC/PICOM.2015.299 (Year: 2015).*

* cited by examiner

SENDER AUTHENTICATED REMITTANCE VIA AN AUTOMATIC TELLER MACHINE

TECHNICAL FIELD

The disclosure relates to automatic teller machines and money transfer systems.

BACKGROUND

Money transfer systems provide a convenient way to send, receive, or transfer money directly between a sender and a recipient without requiring in-person exchanges of cash or other forms of payment. Money transfer systems instead transfer funds through the use of user computing devices and/or places of business. In some examples, money transfer systems include cash-based money transfer systems in which the recipient must go to a brick-and-mortar store front to collect the cash remitted by the sender. In other examples, money transfer systems include electronic money transfer systems that enable users to exchange money directly between accounts using their computing devices, e.g., "smart" phones, "smart" pads, "smart" watches, or tablet, laptop, or desktop computers.

In the example of an electronic money transfer system, each of the sender and the recipient must have access to a computing device capable of executing an application for the system or a browser that supports a website for the system. Each of the users links an account, such as a bank account, credit card account, or the like, to the electronic money transfer system. The users may then be able to send or request funds from each other, or any other user of the system, through a user interface of the application or website for the system that is executed on the users' computing devices. In this example, the recipient would then need to go to a bank or an automatic teller machine (ATM) to withdraw the transferred money in cash from the recipient's account.

SUMMARY

In general, this disclosure describes techniques for sender authenticated remittance via an automatic teller machine (ATM). The techniques include transferring money between a sender and a recipient via the ATM without the recipient needing a computing device or a bank account with which to receive the money. The techniques also include transferring money without the recipient or the sender needing to go a specific brick-and-mortar store front that may have limited or inconvenient locations to initiate or receive the money transfer.

The disclosed techniques enable a remittance server to interact with both a sender via a sender computing device and a recipient via an ATM to perform a money transfer in which the recipient is at least partially authenticated by the sender. According to the techniques of the present disclosure, the ATM is configured to take a picture or a video of the recipient to be sent by the remittance server to the sender computing device for approval by the sender prior to allocating the transferred money to the recipient. For example, a recipient may request funds from a sender via the ATM using the sender's phone number or another unique number to identify the sender. A remittance server associated with the sender's financial institution receives the picture of the recipient along with the sender identifying information, and optionally, the amount of money requested by the recipient from the ATM. Then, the server sends the remittance transaction request with the picture to the sender for approval, denial, or other options, such as offering a different amount of money than originally requested. In this way, the server essentially passes control of the ATM and the remittance of the transferred money to the sender. The techniques of the present disclosure allow people without access to technology and/or without a bank account to still participate in convenient, quick, and reliable money transfers.

In one example, this disclosure is directed to a computer-implemented method comprising receiving, by a server and from an automatic teller machine (ATM), a request for a remittance transaction between a sender and a recipient, wherein the remittance transaction request includes sender identifying information and a picture of the recipient at the ATM; identifying, by the server and based on the sender identifying information, the sender for the remittance transaction request; sending, by the server and to a sender computing device associated with the identified sender, the remittance transaction request including the picture of the recipient at the ATM; receiving, by the server and from the sender computing device, a response to the remittance transaction request, wherein the sender's response comprises one of an approval or denial of the remittance transaction request for the recipient; and sending, by the server and to the ATM, instructions based on the sender's response to the remittance transaction request.

In another example, this disclosure is directed to a server device comprising a memory configured to store a plurality of sender profiles; and one or more programmable processors in communication with the memory and configured to receive, from an automatic teller machine (ATM), a request for a remittance transaction between a sender and a recipient, wherein the remittance transaction request includes sender identifying information and a picture of the recipient at the ATM; identify, from the plurality of sender profiles and based on the sender identifying information, the sender for the remittance transaction request; send, to a sender computing device associated with the identified sender, the remittance transaction request including the picture of the recipient at the ATM; receive, from the sender computing device, a response to the remittance transaction request, wherein the sender's response comprises one of an approval or denial of the remittance transaction request for the recipient; and send, to the ATM, instructions based on the sender's response to the remittance transaction request.

In yet another example, this disclosure is directed to a system for performing remittance transactions, the system comprising an automatic teller machine (ATM) configured to send a request for a remittance transaction between a sender and a recipient, wherein the remittance transaction request includes sender identifying information entered by the recipient at the ATM and a picture of the recipient taken by the ATM; a server device configured to receive the request for the remittance transaction from the ATM, identify the sender for the remittance transaction request based on the sender identifying information, and send the remittance transaction request including the picture of the recipient at the ATM; and a sender computing device associated with the identified sender configured to receive the remittance transaction request from the server device, receive a response to the remittance transaction request from the identified sender, wherein the sender's response comprises one of an approval or denial of the remittance transaction request for the recipient, and send the response to the remittance transaction request back to the server device, wherein the server device is further configured to send instructions to the ATM based on the sender's response to the remittance transaction request.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
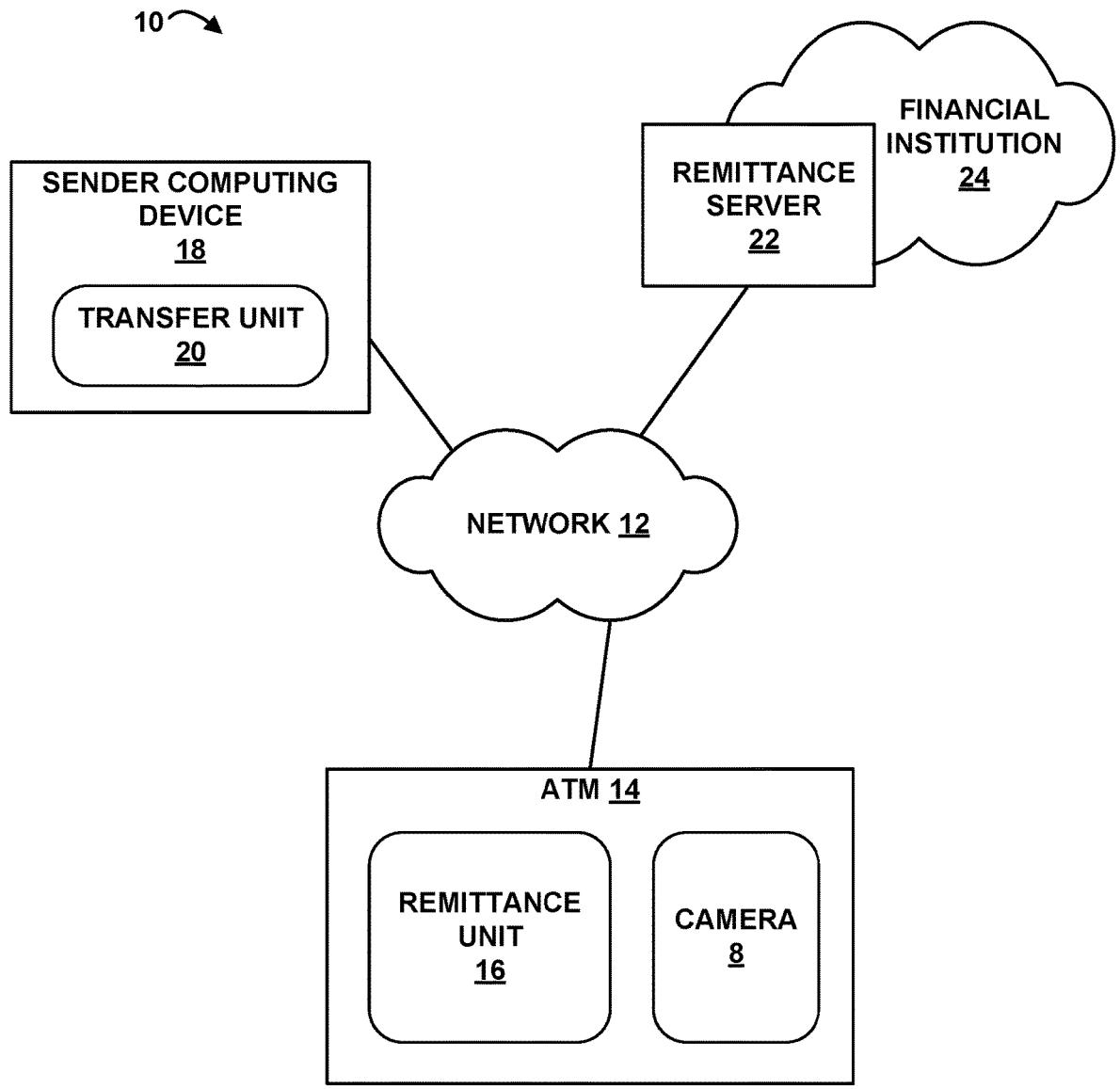
FIG. 1 is a block diagram illustrating an example money transfer system that includes a remittance server configured to enable a sender to authenticate a remittance transaction for a recipient at an ATM using a sender computing device, in accordance with the techniques of this disclosure.

FIG. 1 is a block diagram illustrating an example money transfer system 10 that includes a remittance server 22 configured to enable a sender to authenticate a remittance transaction for a recipient at an ATM 14 using a sender computing device 18, in accordance with the techniques of this disclosure. As illustrated in FIG. 1, remittance system 10 includes remittance server 22 of a financial institution 24, ATM 14 including a remittance unit 16 and a camera 8, and sender computing device 18 including a transfer unit 20. Remittance server 22, ATM 14, and sender computing device 18 are in communication with each other via a network 12. The terms "money transfer" and "remittance transaction" are used herein interchangeably to describe the act of one person (a recipient) receiving money from another person (a sender), in accordance with the techniques of this disclosure.

The money transfer system of FIG. 1 may be used to receive, by a server and from an automatic teller machine (ATM), a request for a remittance transaction between a sender and a recipient, where the remittance transaction request includes sender identifying information and a picture of the recipient at the ATM; identify, by the server and based on the sender identifying information, the sender for the remittance transaction request; send, by the server and to a sender computing device associated with the identified sender, the remittance transaction request including the picture of the recipient at the ATM; receive, by the server and from the sender computing device, a response to the remittance transaction request, where the sender's response comprises one of an approval or denial of the remittance transaction request for the recipient; and send, by the server and to the ATM, instructions based on the sender's response to the remittance transaction request.

As shown in FIG. 1, remittance server 22, ATM 14, and sender computing device 18 are in communication with each other via network 12. In some examples, network 12 may include a private network associated with financial institution 24. In other examples, network 12 may include a public network, such as the Internet. Although illustrated as a single entity, network 12 may include a combination of public and/or private networks. In some examples, network 12 may include one or more of a wide area network (WAN) (e.g., the Internet), a local area network (LAN), a virtual private network (VPN), or another wired or wireless communication network.

ATM 14 may be a device used to perform a variety of transactions, including deposits, withdrawals, and transfers of funds, account balance checks, and, in some cases, purchase of stamps or other goods. ATM 14 may be associated with financial institution 24, which may be a bank or credit union. In some examples, ATM 14 may be owned by financial institution 24 such that customers of financial institution 24 may perform transactions with ATM 14 for no or reduced transactions fees whereas non-customers may be charged additional fees for the use of ATM 14. ATM 14 may be located at a retail banking location or other convenient location such as a grocery store, mall, college campus, or any other suitable location. As illustrated in FIG. 1, ATM 14 includes remittance unit 16. In accordance with the techniques described in this disclosure, remittance unit 16 may present a user interface to a user of ATM 14 and, in response to input from the user, communicate with remittance server 22 to initiate a remittance transaction with a sender, authenticate the user as a registered recipient, and/or allow the user to register themselves as a recipient with a sender. ATM 14 also includes camera 8 for capturing a picture or video of the user of ATM 14.

In some examples, ATM 14 includes a display (not shown in FIG. 1) for displaying information and/or receiving input. For example, the display may comprise a pressure-sensitive touch screen. Alternatively, or additionally, ATM 14 may include a keypad, a biometric input device, or other input devices for receiving inputs. For example, via one of the input devices, ATM 14 may receive input used to identify a user, e.g., a personal identification number (PIN) entered using a touchscreen or a physical keyboard, or a fingerprint or retinal scan entered using a biometric input device. ATM 14 may also include components for vending or accepting cash and/or checks for various transactions including, for example, conventional deposits or withdrawals, money transfer services, or the like. In some examples, ATM 14 may include a component to dispense cash and/or a component to dispense cash within an envelope. ATM 14 may also include a printer component for printing documents for various transactions including, for example, receipts for deposits, receipts for withdrawals, receipts for account balance checks, and/or receipts for remittance transactions.

The components of ATM 14 described herein may be separate components, each dedicated to a separate function, or may be combined in any suitable number of components to perform the functions described herein. For example, ATM 14 may include one component for vending cash for withdrawals and one component for vending cash for remittance transactions. Alternatively, ATM 14 may include a single component for vending cash for both withdrawals and remittance transactions. The single component may include different subcomponents used for performing different tasks or may use the same subcomponents for each task according to particular needs. An example of ATM 14 including remittance unit 16 and camera 8 is described in more detail below with respect to FIG. 4.

In the example illustrated in FIG. 1, ATM 14 communicates with remittance server 22 via network 12. In accordance with the techniques described in this disclosure, remittance server 22 is configured to relay information from ATM 14 to sender computing device 18 or from sender computing device 18 to ATM 14 via network 12 for recipient registration and remittance transactions. This disclosure describes several different techniques in which remittance server 22 may use information and input received from sender computing device 18 and/or ATM 14 to perform a remittance transaction from the sender using sender computing device 18 to the recipient using ATM 14. The different techniques may be used alone or in combination.

As one example of the disclosed techniques, a recipient may request a remittance transaction from a sender using ATM 14. ATM 14 may have a display selection, keypad function, or the like, for the recipient to input the request for the remittance transaction to be performed using the ATM. Upon receiving the request from the recipient to initiate the remittance transaction, ATM 14 activates remittance unit 16 to perform the remittance transaction. Remittance unit 16 may prompt the recipient to enter a phone number or other identifying information of the sender. Additionally, or alternatively, remittance unit 16 may prompt the recipient to enter a unique registration number (URN) that the recipient previously obtained from the sender. For example, the recipient may have received the URN from the sender via a text message, multimedia messaging service (MMS), application "push" notification, email, mail, or the like. In some examples, remittance unit 16 prompts the recipient to enter an amount of money to be requested from the sender for the remittance transaction. In other examples, the sender may determine an amount of money to be transferred to the recipient for the remittance transactions, e.g., in the case of a payroll transaction or other sender-initiated payment. Remittance unit 16 may also notify the recipient that a picture will be taken via camera 8 of ATM 14. ATM 14 then activates camera 8 and captures a picture of the recipient.

According to the techniques of this disclosure, ATM 14 sends the sender's identifying information and the recipient's picture to remittance server 22 for verification. Remittance server 22 may first use the sender's phone number and/or URN received from ATM 14 to look up a profile for the sender. The sender profile may be stored by remittance server 22 and may include the sender's settings for remittance transactions such as, for example, if remittance transactions are allowed, if recipients need to be registered prior to initiating a remittance transaction, if a predetermined remittance amount limit exists, if automatic approval or denial conditions exist, etc. Remittance server 22 uses these settings to determine what action to take with respect to the remittance transaction request. For example, remittance server 22 may determine whether to register the recipient with the sender, deny the remittance transaction request, send information about the remittance transaction request to sender computing device 18, perform facial recognition analysis on the picture of the recipient, or the like.

Based on the settings in the sender's user profile, remittance server 22 may determine to send information about the remittance transaction request to sender computing device 18 for the sender's authorization. In this way, remittance server 22 essentially passes control of ATM 14 and the remittance of the transferred money to the sender via sender computing device 18. Remittance server 22 may send information about the remittance transaction request to sender computing device 18 before, after, or in combination with other actions performed by remittance server 22. For example, remittance server 22 may first perform facial recognition analysis using the picture of the recipient and image data corresponding to registered recipients associated with the sender's user profile, and then send the picture of the recipient to sender computing device 18 after the facial recognition analysis has been completed. Alternatively, remittance server 22 may perform facial recognition analysis using the picture of the recipient and image data corresponding to registered recipients associated with the sender's user profile while simultaneously sending the picture of the recipient to sender computing device 18.

In the illustrated example of FIG. 1, remittance server 22 is associated with the sender's financial institution 24. Financial institution 24 may be a traditional bank or credit union with the capability to maintain user accounts. For example, financial institution 24 may maintain checking, savings, and/or investment accounts for account holders. Financial institution 24 may issue ATM access to accounts within financial institution 24 and/or accounts at other institutions. In other examples, remittance server 22 may be associated with a third-party service provider for one or more financial institutions, e.g., traditional banks or credit unions. In this example, the third-party service provider may not maintain any user accounts. Instead, remittance server 22 may communicate with one or more other servers associated with financial institutions 24 in order to access user accounts to facilitate sender authorized remittance transactions. In either of the above examples, remittance server 22 may have access to user accounts associated or maintained with financial institution 24. An example of remittance server 22 is described in more detail below with respect to FIG. 2.

Sender computing device 18 is a computing device associated with a sender. Sender computing device 18 may include any of a wide range of user devices, including laptop or desktop computers, tablet computers, so-called "smart" phones, "smart" pads, "smart" watches or other wearable devices, Internet of Things (IoT) devices, or other personal digital appliances equipped for wired or wireless communication. Sender computing device 18 may include at least one user interface device (not shown) that enables the sender to interact with sender computing device 18. In some examples, the user interface device of sender computing device 18 is configured to receive tactile, audio, or visual input. In addition to receiving input from the sender, the user interface device of sender computing device 18 may be configured to output content such as a graphical user interface (GUI) for display, e.g., at a display device associated with sender computing device 18. As used herein, sender computing device 18 may be considered a "smart" device that is capable of accessing network 12, e.g., the Internet or another communication network, and executing applications or performing other processing tasks.

Sender computing device 18 includes transfer unit 20 configured to receive information or notifications from remittance server 22 regarding remittance transaction requests received from ATM 14. Transfer unit 20 may present a user interface to allow the sender to set-up his or her profile with remittance server 22, which includes remittance transaction settings such as, for example, if remittance transactions are allowed, if recipients need to be registered prior to initiating a remittance transaction, if a predetermined remittance amount limit exists, if automatic approval or denial conditions exist, etc. Transfer unit 20 prompts the sender via the user interface to approve, deny, or perform other functions regarding remittance transaction requests received from ATM 14 via remittance server 22, such as offering a different amount of money than originally requested by the recipient. Transfer unit 20 may present a user interface to allow the sender to register recipients to streamline the money transfer process. Further, transfer unit 20 may present a user interface to allow the sender to initiate a remittance transaction for a recipient to receive at ATM 14. An example of sender computing device 18 including transfer unit 20 is described in more detail below with respect to FIG. 3.

The disclosed techniques allow a recipient without access to technology and/or without a bank account to participate in convenient, quick, and reliable money transfers. In some examples, the recipient is able to request a remittance transaction using ATM 14 and the sender's identifying information. In other examples, the sender initiates or modifies a remittance transaction using sender computing device 18 for the recipient to accept at ATM 14. In any case, the recipient is not required to have a computing device or a bank account for a remittance transaction to be performed.

The architecture of remittance system 10 illustrated in FIG. 1 is shown for exemplary purposes only and should not be limited to this architecture. Remittance system 10 illustrated in FIG. 1 shows a single remittance server 22 associated with financial institution 24, and a single ATM 14 and a single sender computing device 18 in communication with the single remittance server 22. In other examples, remittance system 10 may include multiple different ATMs in communication with remittance server 22 through which recipients may request remittance transactions from sender computing device 18. In still other examples, remittance system 10 may include multiple different remittance servers associated with the same financial institution 24 and/or different financial institutions to facilitate remittance transactions between sender computing device 18 and recipients at one or more ATMs. In further examples, remittance system 10 may include multiple different sender computing devices in communication with one or more remittance servers to receive and authorize remittance transaction requests from recipients at one or more ATMs.

Figure 2:
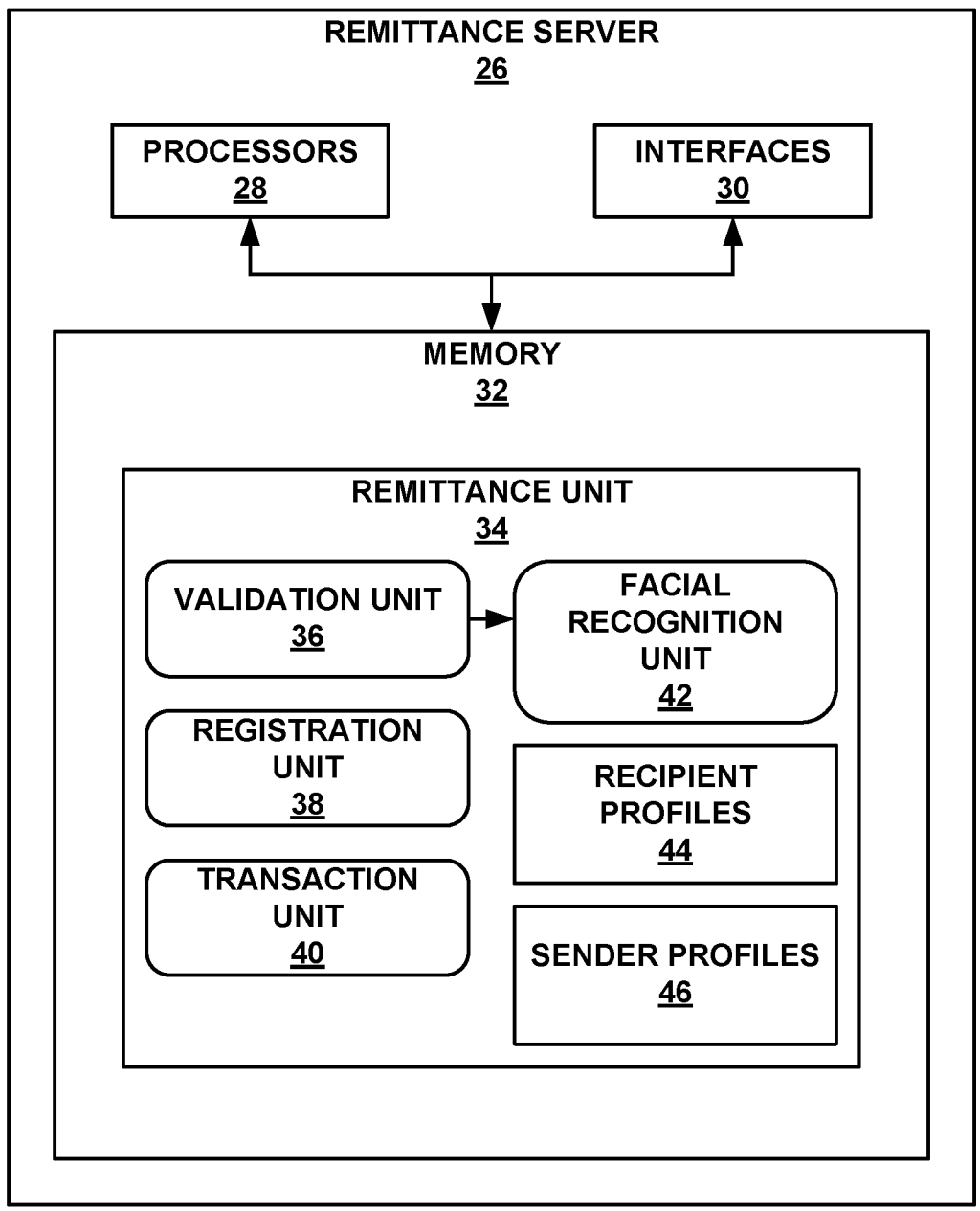
FIG. 2 is a block diagram illustrating an example remittance server configured to facilitate sender authenticated remittance transactions via an ATM, in accordance with the techniques of this disclosure.

FIG. 2 is a block diagram illustrating an example remittance server 26 configured to facilitate sender authenticated remittance transactions via an ATM, in accordance with the techniques of this disclosure. Remittance server 26 is configured to receive a picture of a recipient and sender identifying information. In some examples, remittance server 26 may also be configured to receive an amount of money requested from the ATM. Remittance server 26 then sends the picture and sender identifying information to a sender computing device for approval, denial, or other actions, in accordance with the techniques of this disclosure. In the case in which remittance server 26 also receives an amount of money requested from the ATM, the amount requested may also be sent to the sender computing device. Remittance server 26 may be associated with a financial institution, e.g., financial institution 24 of FIG. 1, or a third-party service provider for one or more financial institutions. Remittance server 26 may operate substantially similar to remittance server 22 from FIG. 1. For example, remittance server 26 may communicate with ATM 14 via network 12 from FIG. 1. In addition, remittance server 26 may communicate with sender computing device 18 via network 12 from FIG. 1.

The architecture of remittance server 26 illustrated in FIG. 2 is shown for exemplary purposes only and remittance server 26 should not be limited to this architecture. In other examples, remittance server 26 may be configured in a variety of ways.

As shown in the example of FIG. 2, remittance server 26 includes one or more processors 28, one or more interfaces 30, and one or more memory units 32. Memory 32 of remittance server 26 includes remittance unit 34, which is executable by processors 28. Remittance unit 34 includes validation unit 36, registration unit 38, transaction unit 40, facial recognition unit 42, recipient profiles 44, and sender profiles 46. Each of the components, units, or modules of remittance server 26 are coupled (physically, communicatively, and/or operatively) using communication channels for inter-component communications. In some examples, the communication channels may include a system bus, a network connection, an inter-process communication data structure, or any other method for communicating data.

Processors 28, in one example, may include one or more processors that are configured to implement functionality and/or process instructions for execution within remittance server 26. For example, processors 28 may be capable of processing instructions stored by memory 32. Processors 28 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 32 may be configured to store information within remittance server 26 during operation. Memory 32 may include a computer-readable storage medium or computer-readable storage device. In some examples, memory 32 includes one or more of a short-term memory or a long-term memory. Memory 32 may include, for example, random access memories (RAM), dynamic random access memories (DRAM), static random access memories (SRAM), magnetic discs, optical discs, flash memories, or forms of electrically programmable memories (EPROM), or electrically erasable and programmable memories (EEPROM). In some examples, memory 32 is used to store program instructions for execution by processors 28. Memory 32 may be used by software or applications running on remittance server 26 (e.g., validation unit 36, registration unit 38, transaction unit 40, or facial recognition unit 42) to temporarily store information during program execution.

Remittance server 26 may utilize interfaces 30 to communicate with external devices via one or more networks, e.g., network 12 from FIG. 1, or via wireless signals. Interfaces 30 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth radios. In some examples, remittance server 26 utilizes interfaces 30 to communicate with an external device such as sender computing device 18 or ATM 14 from FIG. 1.

Remittance unit 34 is configured to facilitate remittance transactions between a sender computing device, e.g., sender computing device 18 from FIG. 1, and an ATM, e.g., ATM 14 from FIG. 1. Remittance unit 34 may facilitate recipient registration with a sender, recipient-initiated remittance transactions, and sender-initiated remittance transactions. Remittance unit 34 may also store sender profiles 46 and store registered recipient profiles 44. In addition, remittance unit 34 may perform preliminary validation of a recipient or a remittance transaction request based on recipient profiles 44 and sender profiles 46. Moreover, the various functions of validation unit 36, registration unit 38, transaction unit 40, and facial recognition unit 42 of remittance unit 34 may be performed simultaneously or may be performed in series, in accordance with the techniques of the disclosure.

For example, remittance unit 34 may facilitate recipient registration with a sender by first receiving a request from a sender computing device to generate a unique registration number (URN) for the sender. The sender may, in turn, send the URN to a recipient for use during an initial remittance transaction and registration session via an ATM. Registration unit 38 may accept the request and generate the URN. The URN may be generated using an algorithm, function, code sequence, or the like. The URN may be a globally unique number generated by registration unit 38, or may be unique to the sender requesting the URN. For example, the URN may include numbers, letters, symbols, and combinations thereof. The URN may include a predetermined amount of characters, such as, for example, up to 20 characters. In some examples, the URN includes 20 characters, 10 characters, 7 characters, 5 characters, or any other amount in accordance with this disclosure. The URN may further include a predetermined combination of numbers, letters, and/or symbols, such as, for example, 4 letters and 3 numbers, 5 numbers and 2 symbols, or any other combination in accordance with this disclosure.

Registration unit 38 may associate the URN with a profile of the requesting sender that is stored in sender profiles 46. Registration unit 38 then sends the URN to the sender computing device. In some examples, registration unit 38 may generate the URN for a particular recipient identified by the sender. In this example, registration unit 38 may generate a recipient profile in recipient profiles 44 for the identified recipient and associate the URN with the recipient profile. The recipient profile may be populated with information regarding the recipient, e.g., recipient name and contact information, that is received from the sender computing device with the request for the URN or upon generation of the URN. In other examples, remittance server 26 may receive the additional recipient information from the sender computing device to be added to the recipient profile after sending the URN to the sender computing device or at a later time.

In some examples, the sender computing device may deliver the URN to a recipient for use during an initial remittance transaction and registration session via an ATM. In other examples, registration unit 38 may deliver the URN to the recipient on behalf of the sender. For example, registration unit 38 may receive an approval notice including the method of delivery and details to be used for delivery of the URN from the sender computing device. Registration unit 38 may then deliver the URN to the recipient. Registration unit 38 may generate a text message, MMS, or email message and send it via a network, e.g., network 12 from FIG. 1. If the URN is to be sent via a letter, registration unit 38 may contact the financial institution to have the letter prepared and sent to the recipient using the information received from the sender computing device.

In some examples, registration unit 38 creates a URN in response to a sender-initiated remittance transaction. Registration unit 38 may operate substantially similar as for generating a URN for registration of a recipient to generate a URN for a sender-initiated remittance transaction.

Furthermore, remittance unit 34 may facilitate recipient registration with a sender by receiving a recipient registration request for a recipient from an ATM, e.g., ATM 14 from FIG. 1. The recipient registration request may include a URN and a picture of the recipient. Registration unit 38 may determine if the URN is valid, e.g., linked to a sender's profile and not previously used to register another recipient. For example, registration unit 38 may compare the received URN against sender profiles 46 to determine if the URN is associated with a sender's profile, and compare the received URN against recipient profiles 44 to determine if the URN has been used by a recipient that has already completed registration. If the URN is not associated with any of sender profiles 46 or if the URN has been previously used to complete registration, registration unit 38 may deny the registration request. Registration unit 38 may then send a notification of the denied request to the ATM. If the URN is associated with one of sender profiles 46 and has not been previously used by another recipient to complete registration with a sender, registration unit 38 may validate the registration request and look up the sender's contact settings in the one of sender profiles 46 to send a notification including the picture of the recipient to a sender computing device for approval or denial of the registration request by the sender.

After the sender approves or denies the registration request using the sender computing device in accordance with the techniques of the disclosure, registration unit 38 receives notification of the approval or denial. If the request is approved, a recipient profile may be generated or updated within recipient profiles 44. Recipient profiles 44 include a profile for each registered recipient. For example, recipient profiles 44 may include details for a given registered recipient that are supplied by the sender and/or the recipient, the date of the registration, and the location of the ATM where the registration was initiated. The details about the given registered recipient may also include the recipient's name, a nickname given to the recipient's profile, the recipient's contact information (e.g., phone number, email address, postal address), and the URN assigned to the recipient.

In addition, each of recipient profiles 44 may include recipient-specific sender settings and/or a recipient-specific transaction history. To the extent that the sender's settings for a specific recipient are different than the sender's default settings, the recipient-specific settings may include conditions for automatic approval of remittance transaction requests, remittance transaction request amount limits, time settings, security preferences, bank account selection, or combinations thereof. Additional details regarding a sender's default remittance transaction settings are described in more detail below with respect to sender profiles 46.

In order to participate in remittance transactions as described in this disclosure, a sender may establish a user profile with remittance server 26. Sender profiles 46 include a profile for each registered sender. For example, sender profiles 46 may include the sender's name, the sender's bank account information, the sender's contact information (e.g., phone number, email address, postal address), and a list of URNs associated with the sender. Based on sender profiles 46, remittance unit 34 is able to identify a proper sender for a requested remittance transaction based on either the URN or other sender identifying information provided by the recipient via the ATM. Remittance server 26 is further able to identify and access one or more bank accounts associated with the proper sender to perform the requested remittance transaction upon approval by the sender. The one or more bank accounts may be associated with a financial institution, e.g., financial institution 24 from FIG. 1. The one or more bank accounts may be a checking account, a savings account, an investment account, or the like. The remittance amount may be withdrawn from the sender's bank account upon approval of the remittance transaction.

Sender profiles 46 may also include default settings for remittance transactions for each sender. For example, the default settings for a given sender may include conditions for automatic approval or denial of remittance transactions, one time and/or recurring automatic approval preferences, acceptance of remittance transaction requests from non-registered recipients, remittance transaction request amount limits, bank account preferences, notification preferences, time settings, and security preferences.

When the conditions for automatic approval or denial of remittance transactions are satisfied, validation unit 36 of remittance unit 34 may automatically approve or deny the remittance transaction requests without manual input from the sender. The conditions for automatic approval or denial may be based on the recipient requesting the money transfer, the amount being requested, the ATM location from which the remittance is being requested, or the time of day. The one time and/or recurring automatic approval preferences may indicate whether the conditions specified for automatic approval or denial are established for a single transaction or for recurring transactions. For example, according to a one time automatic approval preference, validation unit 36 may automatically approve or deny a qualifying remittance transaction request one time and then return to requiring manual input from the sender. As another example, according to a recurring automatic approval preference, validation unit 36 may automatically approve or deny qualifying remittance transaction requests as long as the setting is enabled. The one time and/or recurring automatic approval preferences may be based on a recipient, an amount requested, a time requested, the next remittance transaction request received, or the like. In some examples, the recurring automatic approval preferences may be set-up to last a specific amount of time (e.g., a certain amount of days) or for a certain amount of transactions (e.g., a certain number remittance transaction requests from one recipient or a certain number of total remittance transaction requests from all recipients).

Based on the setting for acceptance of remittance transaction requests from non-registered recipients included in sender profiles 46, validation unit 36 may automatically deny any remittance transaction requests received from non-registered recipients. In this example, a sender may only want people he or she has previously registered to be allowed to send him or her a remittance transaction request. In other examples, a sender may want any recipient, registered or non-registered, to be allowed to request remittance from them, and may set the associated one of sender profiles 46 to allow such requests.

Based on the settings for remittance transaction request amount limits included in sender profiles 46, validation unit 36 may automatically deny any remittance transaction requests for amounts that exceed the remittance transaction limits. In other examples, validating unit 36 may send an additional notification to the sender computing device for remittance transaction requests for amounts above the remittance transaction limits. Different remittance transaction request amount limits may be set for different recipients. Remittance transaction request amount limits may be any amount, such as, for example, $1000, $500, $100, $50, or $25.

Bank account preferences included in sender profiles 46 may identify one or more bank accounts to be used for remittance transactions. For example, a given one of sender profiles 46 may include information for two separate bank accounts. The bank account preferences may be configured to have remittance funds taken from both bank accounts, e.g., 50% of the remittance funds from the first bank account and 50% of the remittance funds from the second bank account. In other examples, a given one of sender profiles 46 may include information for three separate bank accounts. The bank account preferences may be configured to have remittance funds taken from all bank accounts, e.g., 25% of the remittance funds from the first bank account, 25% of the remittance funds from the second bank account, and 50% of the remittance funds from the third bank account. The percentage of the remittance funds taken from each of the identified bank accounts may be changed by the sender, and the percentages may be any conceivable percentages that add up to 100%. Additionally, or alternatively, the bank account preferences may be configured to have the remittance funds taken from the bank account with the highest balance. Furthermore, the bank account preferences may specify that the remittance funds be taken from the one or more identified bank accounts in a cycle. For example, a first remittance transaction may be taken from a first bank account, a second remittance transaction may be taken from a second bank account, a third remittance transaction may be taken from the first bank account, and so on. In some examples, the bank account preferences may be configured to have a certain amount of money taken from one bank account and the balance taken from another bank account, e.g., $50 taken from a first bank account and any requested amount over $50 taken from a second bank account. The bank account preferences included in sender profiles 46 may be applied to any number of bank accounts or other financial accounts held by the sender, and may include any of the preferences described herein or in accordance with the disclosure, alone or in any combination.

The notification preferences included in sender profiles 46 may indicate how the associated sender prefers to receive alerts and remittance transaction requests for approval. For example, the notification preferences may indicate email notifications, text message notifications, MMS, application "push" notifications, or some hierarchy or combination of these and other notification types. The notifications may include remittance transaction request information such as a recipient's name, a recipient's picture, and/or an amount requested, bank account balance information, alerts for when the sender's phone number has been entered at an ATM for a remittance transaction, an amount requested above a remittance transaction request amount limit, or a remittance transaction request from a non-registered recipient. The notification preferences may further include selections for specific notifications and time preferences during which to receive notifications.

The time settings included in sender profiles 46 may indicate time intervals for remittance transaction requests, time intervals for automatic approval or denial of remittance transaction requests, time intervals for notification acceptance, or the like. The specified time intervals may be any length of time from a few minutes to several days. For example, the time settings may indicate a time interval set to automatically approve remittance transaction requests between the hours of 8 PM and 6 AM. The time settings may include multiple time intervals for different purposes, or may include one time interval for multiple purposes, e.g., the same time interval used for automatic approval being turned on and notifications being turned off. The time settings may be based on the sender's time zone. For example, a request submitted at 6 PM local time for the recipient may still be automatically approved if it is between the hours of 8 PM and 6 AM in the sender's time zone.

The security preferences included in sender profiles 46 may include requesting additional information from the recipient, asking the recipient additional security questions, taking an additional picture of the recipient, requesting additional information about the location of the ATM being used, or the like. The security preferences may apply to all recipients, only non-registered recipients, only registered recipients, or to specific recipients.

In some examples, the default settings in sender profiles 46 may be the same or substantially the same as the recipient-specific sender settings in recipient profiles 44. In some examples, both settings in sender profiles 46 and recipient-specific sender settings in recipient profiles 44 are managed using the sender computing device.

Remittance unit 34 may facilitate a remittance transaction between a sender and a recipient in response to receiving a remittance transaction request from an ATM. The remittance transaction request may at least include sender identifying information, e.g., the sender's phone number, and a picture of the recipient. In some examples, the remittance transaction request may also include a requested remittance amount. Validation unit 36 may be used to approve, deny, or validate the remittance transaction request. For example, validation unit 36 may first use the sender identifying information included in the remittance transaction request to look up the sender's profile in sender profiles 46. If no profile matching the sender identifying information is found, validation unit 36 may send a notification to the ATM denying the remittance transaction request due to the sender not being signed up to perform remittance transactions. Validation unit 36 may send a notification to the sender computing device indicating that his or her identifying information was used at an ATM for an attempted remittance transaction. Validation unit 36 may further send the sender computing device a notification including a link for the sender to register for or get information about the remittance transaction service as described herein.

If a profile matching the sender identifying information is found in sender profiles 46, validation unit 36 may use the settings included in the sender profile to determine how to proceed with the remittance transaction request. For example, if the sender profile only allows remittance transaction requests from registered recipients, validation unit 36 may send the recipient's picture to facial recognition unit 42 to determine whether the recipient is registered. Facial recognition unit 42 may use facial recognition analysis to determine if the recipient's picture matches with one or more pictures or image data included in recipient profiles 44. In some examples, recipient profiles 44 include one or more pictures or image data of each recipient captured during registration. In other examples, recipient profiles 44 include one or more pictures or image data of each recipient captured during registration as well as one or more pictures or image data of each recipient captured during subsequent remittance transactions performed after registration.

Facial recognition unit 42 may perform a variety of facial recognition analysis techniques on the pictures of recipients received during registration and/or during remittance transactions. Facial recognition unit 42 may perform traditional facial recognition analysis based on algorithms to identify, extract, and/or analyze facial features from the pictures. For example, facial recognition unit 42 may identify relative position, size, and/or shape of various facial features, such as, for example, eyes, nose, cheekbones, jaw, etc. The data identified and extracted from the pictures may be compressed and stored in recipient profiles 44. Facial recognition unit 42 may also utilize three-dimensional face recognition, skin texture analysis, thermal cameras, or the like to perform facial recognition analysis.

If facial recognition unit 42 determines that the recipient's picture is not a match with any of recipient profiles 44, facial recognition unit 42 may notify validation unit 36 that the recipient is not registered with the identified sender. If, according to the settings in the identified sender's profile, only registered recipients are allowed to request remittance transactions from the sender, validation unit 36 may in turn send a notification of the denied request to the ATM. Validation unit 36 may also send a notification to the sender computing device that his or her identifying information was used at an ATM for an attempted remittance transaction by a non-registered recipient. Conversely, if, according to the settings in the identified sender's profile, non-registered recipients are allowed to request remittance transactions from the sender, validation unit 36 may continue the remittance transaction process without sending a notification to the sender computing device. In other examples, validation unit 36 may proceed with the remittance transaction without the use of facial recognition unit 42 if the settings allow non-registered recipients to request remittance.

If facial recognition unit 42 determines that the recipient's picture is a match with one of recipient profiles 44, facial recognition unit 42 may notify validation unit 36 and provide details about the registered recipient based on the information included in the one of the recipient profiles 44. In any of the above examples, validation unit 36 may record information about the attempted remittance transaction in recipient profiles 44, such as the date of the attempted transaction, the location of the ATM where the transaction was initiated, the remittance amount requested, or the like.

Upon receipt of a notification that the recipient is a registered recipient or upon verification that non-registered recipients are allowed to request remittance transactions from the sender, validation unit 36 may check the sender's profile settings to determine what action to take with respect to the remittance transaction request. For example, if the recipient is a registered recipient, validation unit 36 may check both recipient-specific sender settings for the registered recipient in recipient profiles 44 and default sender settings for the sender in the one of sender profiles 46. If the recipient is not a registered recipient, validation unit 36 may check only the default sender setting in the one of sender profiles 46. Validation unit 36 may determine the next steps in the remittance transaction process based on the recipient-specific settings and/or the default settings. The process will be described below using the general term "settings." In accordance with the techniques of the disclosure, "settings" should be understood to mean recipient-specific settings from recipient profiles 44 and/or default settings from sender profiles 46.

In the case where conditions for automatic approval or denial of remittance transactions are included in the settings, validation unit 36 may determine if the remittance request satisfies the settings for automatic approval or denial. For example, validation unit 36 may determine if the recipient requesting the remittance transaction, the amount being requested, the ATM location from which the remittance is being requested, or the time of day is subject to the remittance request being automatically approved or denied as specified by the settings.

In the case where remittance transaction amount limits are included in the settings, validation unit 36 may determine whether a remittance amount requested by the recipient is greater than, less than, or equal to the remittance transaction amount limit. If the requested remittance amount is greater than the remittance transaction amount limit, validation unit 36 may send a notification to the ATM denying the remittance transaction request or prompting the recipient to enter a new remittance amount at the ATM.

If the recipient enters a new remittance amount, validation unit 36 may determine whether the new remittance amount is greater than, less than, or equal to the remittance transaction limit. If the requested remittance amount is still greater than the remittance transaction limit, validation unit 36 may again send a notification to the ATM either denying the remittance transaction request or prompting the recipient to enter a new remittance amount. This may continue until the remittance amount is less than or equal to the remittance transaction limit or a time out occurs. For example, validation unit 36 may only allow a certain amount of new remittance amounts to be entered before automatically denying the remittance transaction request. In some examples, validation unit 36 may allow less than 10 remittance amount entries per remittance transaction request.

In the case where time intervals are included in the settings, such as, for example, time intervals to allow remittance transaction requests, time intervals to turn on/off automatic approval or denial of remittance transaction requests, or time intervals for notification acceptances, validation unit 36 may check if the time of the request is within the time interval to allow remittance transaction requests. If not, validation unit 36 may send a notification of the denied request to the ATM. Validation unit 36 may also determine if the time of request is within the time interval to automatically approve or deny remittance transaction requests.

In the case where security preferences are included in the settings, validation unit 36 may facilitate requests for additional information about the recipient, answers to additional security questions, additional pictures of the recipient, information about the location of the ATM being used, or the like. If these additional security preferences are included in the settings, validation unit 36 may send a notification to the ATM to retrieve the requested information. Validation unit 36 may receive the additional security information from the ATM and verify the information using facial recognition unit 42, based on information included in either sender profiles 46 or recipient profiles 44, or by requesting approval of the information by the sender.

In some examples, validation unit 36 may also verify that the sender's one or more bank accounts to perform the remittance transaction have sufficient funds to complete the remittance transaction. Validation unit 36 may communicate with the financial institution, ATM, or the sender computing device to determine if the funds are sufficient for the remittance transaction.

If validation unit 36 determines that the request is to be denied based on the settings included in the identified sender's profile, validation unit 36 may send a notification of the denied request to the ATM. If the remittance transaction request was denied, validation unit 36 may record information about the attempted transaction in recipient storage 44, in accordance with the techniques of the disclosure. Validation unit 36 may also send a notification to the sender computing device that the sender's identifying information was used at an ATM for an attempted remittance transaction by a recipient and was denied based on one or more of the default settings included in the sender's profile.

In accordance with the techniques of the disclosure, validation unit 36 may verify additional or alternative settings. Moreover, validation unit 36 may verify the settings alone or simultaneously, and in any order, according to the techniques of the disclosure.

After validation unit 36 has checked the settings and if the request has been validated for automatic approval, validation unit 36 may send the remittance transaction request to transaction unit 40. In some examples, transaction unit 40 verifies that the sender's one or more bank accounts to perform the remittance transaction have sufficient funds to complete the remittance transaction. If transaction unit 40 verifies that the one or more bank accounts have sufficient funds to perform the remittance transaction, transaction unit 40 may send an approval notification to the ATM for the ATM to facilitate delivery of the remittance funds. Transaction unit 40 may then withdrawal the proper amount of money from the sender's one or more bank accounts. Transaction unit 40 may record information about the approved transaction in recipient profiles 44. Transaction unit 40 may also send a notification to the sender computing device indicating that a remittance transaction has been automatically approved and completed.

After validation unit 36 has checked the settings and if the request has not been validated for automatic approval, validation unit 36 may send a notification including the remittance transaction request to the sender computing device for the sender to approve or deny. The remittance transaction request may include the sender's identifying information and the recipient's picture. In some examples, the remittance transaction request may also include information about the recipient (if the recipient is registered) and/or the amount requested (if the request is recipient-initiated). The notification may be in the form of an email message, a text message, MMS, or an application "push" notification. In response to the notification, validation unit 36 may receive transaction approval, transaction denial, changes to the requested transaction, or requests for additional information from the sender computing device. In some examples, if validation unit 36 does not receive a response from the sender computing device within a predetermined amount of time, the remittance transaction request will time out and automatically be denied. The predetermined amount of time may be determined by the financial institution associated with the remittance server, e.g., financial institution 24 from FIG. 1. The predetermined amount of time may be less than 10 minutes.

If validation unit 36 receives a response from the sender computing device approving the remittance transaction request within the predetermined amount of time, validation unit 36 may send the response from the sender computing device to transaction unit 40. Transaction unit 40 may verify that the sender's one or more bank accounts have sufficient funds to complete the remittance transaction. If transaction unit 40 determines that the one or more bank accounts have sufficient funds for the remittance transaction and the sender approved the remittance transaction request, transaction unit 40 may send an approval notification to the ATM and instruct the ATM to facilitate delivery of the remittance funds to the recipient. Transaction unit 40 may withdrawal the appropriate amount of money from the sender's one or more bank accounts for delivery to the recipient.

If validation unit 36 receives an updated remittance transaction request due to the sender changing the requested remittance amount, validation unit 36 may send a notification of the change to transaction unit 40 and to the ATM. The updated remittance transaction request may include a modified remittance transaction amount that is different that the original remittance amount. In some examples, transaction unit 40 may request approval of the modified remittance amount from the recipient via the ATM prior to sending a notification to the ATM to deliver the sender- and recipient-approved amount of remittance funds. In other examples, transaction unit 40 may send a notification of the changed remittance amount and instructions to deliver the modified amount of remittance funds to the ATM without requiring approval by the recipient. Transaction unit 40 may then instruct the ATM to facilitate delivery of the modified remittance amount to the recipient and withdrawal the modified amount of money from the sender's one or more bank accounts.

If validation unit 36 receives a request for additional security information from the sender computing device, validation unit 36 may send a notification to the ATM to prompt the recipient to input the necessary information, to take an additional picture of the recipient, or the like. Validation unit 36 may receive the additional security information from the ATM, and verify the information using facial recognition unit 42, based on information included in either sender profiles 46 or recipient profiles 44, or by requesting approval of the information by the sender. If validation unit 36 cannot verify the additional security information received, validation unit 36 may deny the remittance request.

In the case in which validation unit 36 or transaction unit 40 denies the remittance request, validation unit 36 or transaction unit 40 may send a notification of the denied request to the ATM and record information about the attempted transaction in recipient profiles 44, in accordance with the techniques of the disclosure. Validation unit 36 or transaction unit 40 may also send a notification to the sender computing device informing the sender that the remittance transaction request was denied and the reason it was denied, e.g., validation unit 36 did not receive a response within the predetermined amount of time.

Transaction unit 40 may further receive from the sender computing device a notification of a sender-initiated remittance transaction for a given recipient. Upon receipt of the notification, transaction unit 40 may log details of the pending remittance transaction in either the one of sender profiles 46 associated with the sender or the one of recipient profiles 46 associated with the given recipient. The logged details may include the sender's identifying information, the remittance amount, and the intended recipient's identifying information.

Remittance unit 34 may then receive a notification from an ATM regarding a recipient requesting a sender-initiated remittance transaction. Validation unit 36, facial recognition unit 42, and transaction unit 40 may operate substantially similar for both remittance transaction requests received from an ATM, and for acceptance of sender-initiated remittance transactions at an ATM, in accordance with the techniques of the disclosure.

Figure 3:
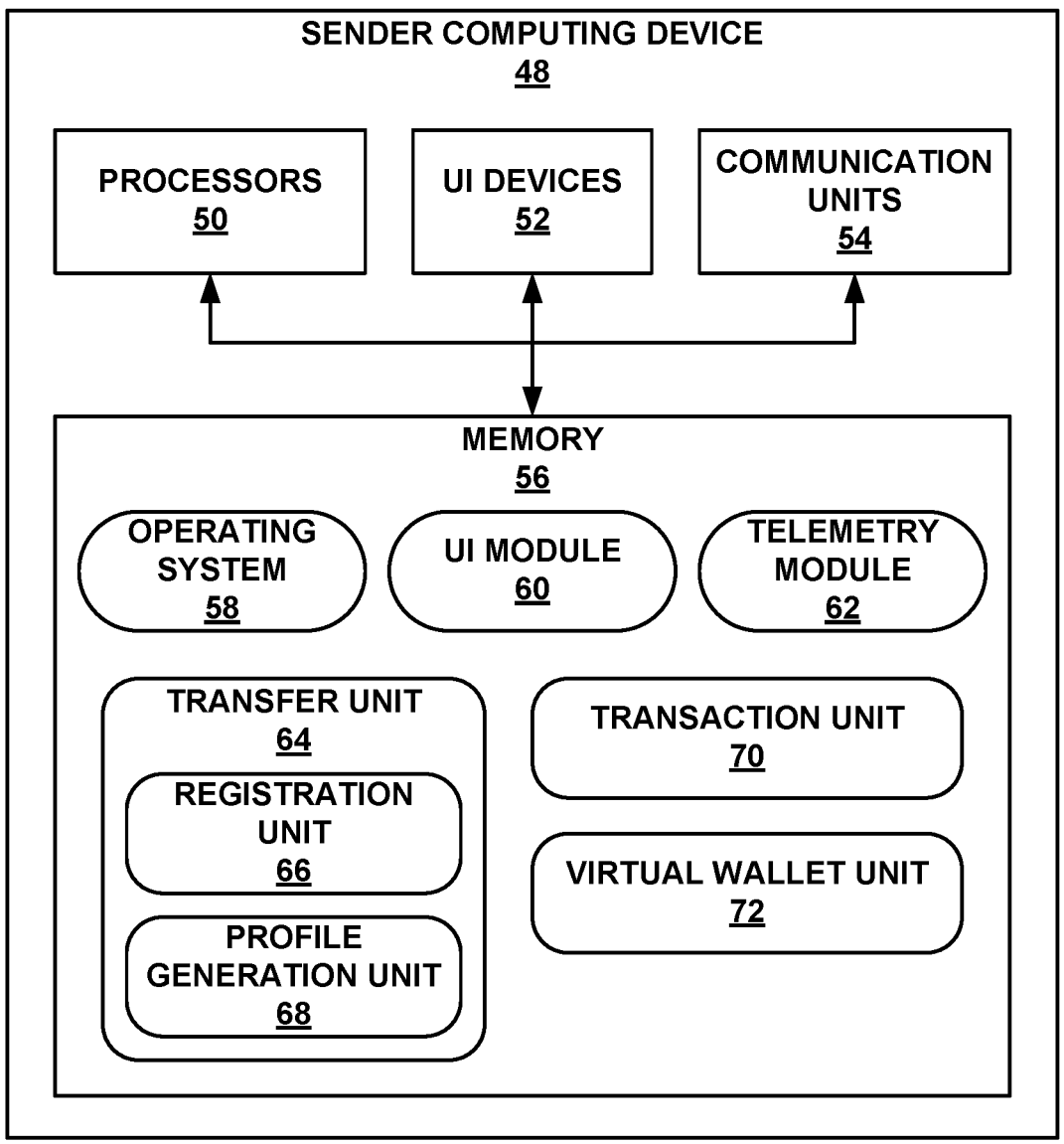
FIG. 3 is a block diagram illustrating an example sender computing device for executing authentication of a remittance transaction for a recipient at an ATM, in accordance with the techniques of this disclosure.

FIG. 3 is a block diagram illustrating an example sender computing device 48 for executing authentication of a remittance transaction for a recipient at an ATM, in accordance with the techniques of this disclosure. Sender computing device 48 may be configured to execute authentication of a remittance transaction, initiate a remittance transaction, and/or take control of an ATM to perform a remittance transaction. Sender computing device 48 may operate substantially similar to sender computing device 18 from FIG. 1. For example, sender computing device 48 may communicate with remittance server 22 via network 12 from FIG. 1. The architecture of sender computing device 48 illustrated in FIG. 3 is shown for exemplary purposes only and sender computing device 48 should not be limited to this architecture. In other examples, sender computing device 48 may be configured in a variety of ways.

As shown in the example of FIG. 3, sender computing device 48 includes one or more processors 50, one or more user interface (UI) devices 52, one or more communication units 54, and one or more memory units 56. Memory 56 of sender computing device 48 includes operating system 58, UI module 60, telemetry module 62, transfer unit 64, transaction unit 70, and virtual wallet unit 72, which are executable by processors 50. Each of the components, units, or modules of sender computing device 48 are coupled (physically, communicatively, and/or operatively) using communication channels for inter-component communications. In some examples, the communication channels may include a system bus, a network connection, an inter-process communication data structure, or any other method for communicating data.

Processors 50, in one example, may include one or more processors that are configured to implement functionality and/or process instructions for execution within sender computing device 48. For example, processors 50 may be capable of processing instructions stored by memory 56. Processors 50 may include, for example, microprocessors, DSPs, ASICs, FPGAs, or equivalent discrete or integrated logic circuitry, or a combination of any of the foregoing devices or circuitry.

Memory 56 may be configured to store information within sender computing device 48 during operation. Memory 56 may include a computer-readable storage medium or computer-readable storage device. In some examples, memory 56 includes one or more of a short-term memory or a long-term memory. Memory 56 may include, for example, RAM, DRAM, SRAM, magnetic discs, optical discs, flash memories, or forms of EPROM, or EEPROM. In some examples, memory 56 is used to store program instructions for execution by processors 50. Memory 56 may be used by software or applications running on sender computing device 48 (e.g., transfer unit 64, transaction unit 70, or virtual wallet unit 72) to temporarily store information during program execution.

Sender computing device 48 may utilize communication units 54 to communicate with external devices via one or more networks, e.g., network 12 from FIG. 1, or via wireless signals. Communication units 54 may be network interfaces, such as Ethernet interfaces, optical transceivers, RF transceivers, or any other type of devices that can send and receive information. Other examples of interfaces may include Wi-Fi, NFC, or Bluetooth® radios.

UI devices 52 may be configured to operate as both input devices and output devices. For example, UI devices 52 may be configured to receive tactile, audio, or visual input from a user of sender computing device 48. In addition to receiving input from a user, UI devices 52 may be configured to provide output to a user using tactile, audio, or video stimuli. In one example, UI devices 52 may be configured to output content such as a graphical user interface (GUI) for display at a display device. UI devices 52 may include a presence-sensitive display that displays a GUI and receives input from a user using capacitive, inductive, and/or optical detection at or near the presence sensitive display.

Other examples of UI devices 52 include a mouse, a keyboard, a voice responsive system, a video camera, a microphone, or any other type of device for detecting a command from a user, a sound card, a video graphics adapter card, or any other type of device for converting a signal into an appropriate form understandable to humans or machines. Additional examples of UI devices 52 include a speaker, a cathode ray tube (CRT) monitor, a liquid crystal display (LCD), an organic light emitting diode (OLED), or any other type of device that can generate intelligible output to a user.

Operating system 58 controls the operation of components of sender computing device 48. For example, operating system 58, in one example, facilitates the communication of UI module 60, telemetry module 62, transfer unit 64, transaction unit 70, and virtual wallet unit 72 with processors 50, UI devices 52, communication units 54, and memory 56. UI module 60, telemetry module 62, transfer unit 64, transaction unit 70, and virtual wallet unit 72 may each include program instructions and/or data stored in memory 56 that are executable by processors 50. For example, transfer unit 64 and transaction unit 70 may each include instructions that cause sender computing device 48 to perform one or more of the techniques described in this disclosure.

UI module 60 may be software and/or hardware configured to interact with one or more UI devices 52. For example, UI module 60 may generate a GUI display to be displayed using one or more UI devices 52 or may generate audio to be transmit to a user through one or more UI devices 52. In some examples, UI module 60 may process an input after receiving it from one of UI devices 52, or UI module 60 may process an output prior to sending it to one of UI devices 52.

Telemetry module 62 may be software and/or hardware configured to interact with one or more communication units 54. Telemetry module 62 may generate and/or process data packets sent or received using communication units 54. In some examples, telemetry module 62 may process one or more data packets after receiving it from one of communication units 54. In other examples, telemetry module 62 may generate one or more data packets or process one or more data packets prior sending it via communication units 54.

Sender computing device 48 may include additional components that, for clarity, are not shown in FIG. 3. For example, sender computing device 48 may include a battery to provide power to the components of sender computing device 48. Similarly, the components of sender computing device 48 shown in FIG. 3 may not be necessary in every example of sender computing device 48.

In the example illustrated in FIG. 3, transfer unit 64 includes registration unit 66 and profile generation unit 68. Registration unit 66 is configured to present a user interface for a user to register new recipients or manage registered recipients for remittance transactions. A user may register one or more recipients using the user interface of registration unit 66 in order to have unique settings for each registered recipient. For example, the user may choose to have a different predetermined remittance transaction limit for at least one registered recipient, have additional security questions to be answered for at least one registered recipient, have automatic (e.g., without manual input from the sender) approval for at least one registered recipient. In other examples, the user may register one or more recipients to increase efficiency of the remittance process. For example, a database of captured pictures or image data of registered recipients may be created and used for facial recognition analysis by the remittance server, e.g., remittance server 22 from FIG. 1, to verify the identity of a recipient. Further, the user may have a setting to only accept remittance transaction requests from registered recipients.

In order to register a new recipient, registration unit 66 may send a registration request to a remittance server, e.g., remittance server 26 of FIG. 2, to generate a URN. Registration unit 66 may display on a user interface several delivery options to deliver the URN to the intended recipient after receiving the URN from the remittance server. The delivery options may include an email message, a text message, MMS, a letter (e.g., a letter delivered through a mail delivery service), or the like. The mail delivery service may include a post office system or courier service, such as, for example, the United States Post Office (USPS), United Parcel Service (UPS), or Federal Express (FedEx). Registration unit 66 may prompt the user to add details to be used for delivery of the URN, e.g., the intended recipient's name, email address, phone number, address, or the like. Registration unit 66 may prompt the user to enter only the details for the chosen delivery option. For example, registration unit 66 may prompt the user to input the intended recipient's phone number if a text message was chosen as the delivery option. Additionally, or alternatively, registration unit 66 may prompt the user to optionally input all the details known. For example, the user may add the address of the intended recipient in addition to the recipient's phone number if a text message was chosen as the delivery method. In some examples, registration unit 66 presents an error message if the details supplied are insufficient to use the selected delivery option, e.g., if the user input a phone number for the email delivery option.

In some examples, registration unit 66 may prompt the user to approve the details of the URN delivery prior to delivering the URN to the recipient. In some examples, registration unit 66 facilitates delivery of the URN to the intended recipient. In other examples, registration unit 66 may send the delivery information to the remittance server for delivery of the URN to the intended recipient.

Registration unit 66 may notify the user upon receiving a registration request from a remittance server. The notification may prompt the user to approve or deny the registration request. In some examples, the user has a predetermined amount of time to respond or select an action using sender computing device 48. Registration unit 66 may send the approved or denied request to the remittance server. In some examples, registration unit 66 may present a notification of the completed registration on sender computing device 48.

Registration unit 66 may present a user interface to allow the user access to registered recipient profiles. The user interface may allow the user to add, change, or delete information about a registered recipient, recipient-specific settings, and/or remittance transaction history through registration unit 66.

Profile generation unit 68 may provide a user interface for the user to enroll in remittance services as a sender, control settings for remittance transactions, or the like. Profile generation unit 68 may allow the user to generate a sender profile to be stored in a remittance server, e.g., one of sender profiles 46 from FIG. 2.

Profile generation unit 68 may additionally include a user interface that presents a help screen. The help screen may allow a user to access a manual on how to perform remittance transactions using the disclosed techniques, an online database or website including questions and answers, tutorials, a chat or video-chat help service representative, or a forum to ask questions.

Transaction unit 70 is configured to receive remittance transaction requests from a remittance server, e.g., remittance server 22 from FIG. 1. The remittance transaction request includes a picture of the recipient. In some examples, the remittance transaction request may include an amount being requested by the recipient. In further examples, the remittance transaction request may include the recipient's address, phone number, or other identifying information. If a recipient is not registered, the remittance transaction request may include less information about the recipient than a request from a registered recipient.

Transaction unit 70 may present a notification including the remittance transaction request for the user to view. The notification may be in the form of an email message, a text message, MMS, or an application "push" notification. The user may be able to approve, deny, make a change, or request additional information through a response or selection using sender computing device 48. In some examples, the user has a predetermined amount of time to respond to or select an action in the notification, in accordance with the techniques of the disclosure.

If transaction unit 70 receives an approval from the user, transaction unit 70 may send an approval notice to the remittance server. If transaction unit 70 receives a denial from the user, transaction unit 70 may send a denial notice to the remittance server.

In some examples, the user may make a change to the remittance transaction request, such as, for example, change the remittance amount. After the user makes the change, transaction unit 70 may send an updated remittance transaction request to the remittance server. Transaction unit 70 may also allow the user to request additional information, such as, for example, additional security questions, an additional picture of the recipient, or additional information about the location of the ATM being used. Transaction unit 70 may then send the instructions to the remittance server.

Transaction unit 70 may present a user interface including the additional information received from the remittance server for the user to view. The user may be able to approve, deny, make a change, or request further information through a response or selection on the user interface. Upon the selection, transaction unit 70 may follow the appropriate technique in accordance with the disclosure.

Transaction unit 70 may also allow the user to initiate a money transfer. In some examples, transaction unit 70 may present a user interface that allows the user to select an ATM for the remittance transaction to take place at or a desired recipient to receive the remittance amount. For instance, transaction unit 70 may allow the user to choose an ATM through the use of an address or zip code search, using a map interface, or by presenting a list of ATMs. Transaction unit 70 may suggest ATMs to use based on registered recipient information accessed from the recipient profiles of the remittance server. Transaction unit 70 may enable the user to select a recipient from the list of registered recipients included in the recipient profiles, by entering a recipient's name or other identifying information, or by requesting a URN to be created. The URN may be used as the sender's identifying information to be entered at an ATM by a recipient. Transaction unit 70 may also allow the user to schedule a specific time for the money transfer to occur at a designated ATM.

Transaction unit 70 may prompt the user to enter the amount of money to be transferred to the recipient. In some examples, transaction unit 70 prompts the user to select a delivery option to notify the recipient of the sender-initiated money transfer. The delivery options may include an email message, a text message, MMS, a letter, or the like. The notification may include the user's name, phone number, email address, amount of money, location of the ATM, and/or time of the money transfer. Transaction unit 70 may prompt the sender to add details used for delivery of the notification. Transaction unit 70 may prompt the sender to input the intended recipient's name, email address, phone number, or address, or transaction unit 70 may obtain some or all of the information from one of the recipient profiles stored by the remittance server. In some examples, transaction unit 70 may facilitate delivery of the notification to the intended recipient. In other examples, transaction unit 70 may prompt the remittance server to deliver the notification to the intended recipient.

Virtual wallet unit 72 is configured to perform payment transactions for a user. Virtual wallet unit 72 may store one or more user selectable virtual assets for the performance of online transactions via a website, a point of sale (POS) device, or another external device. Virtual wallet unit 72 may include a plurality of virtual financial assets having individual assigned values and/or a plurality of virtual non-financial assets used to perform the online transactions. Each of the virtual financial assets included in virtual wallet unit 72 may correspond to a financial asset held by a financial institution, and each of the virtual non-financial assets included in virtual wallet unit 72 may correspond to a document, e.g., an identification card, held by the user.

In one example, a user's bank account information is obtained using virtual wallet unit 72. For example, profile generation unit 68 may access virtual wallet unit 72 to obtain bank account information to link to the user's profile, such as, for example, bank account number, routing number, and/or bank account balance. Virtual wallet unit 72 may provide information for one or more bank accounts to profile generation unit 68.

Figure 4:
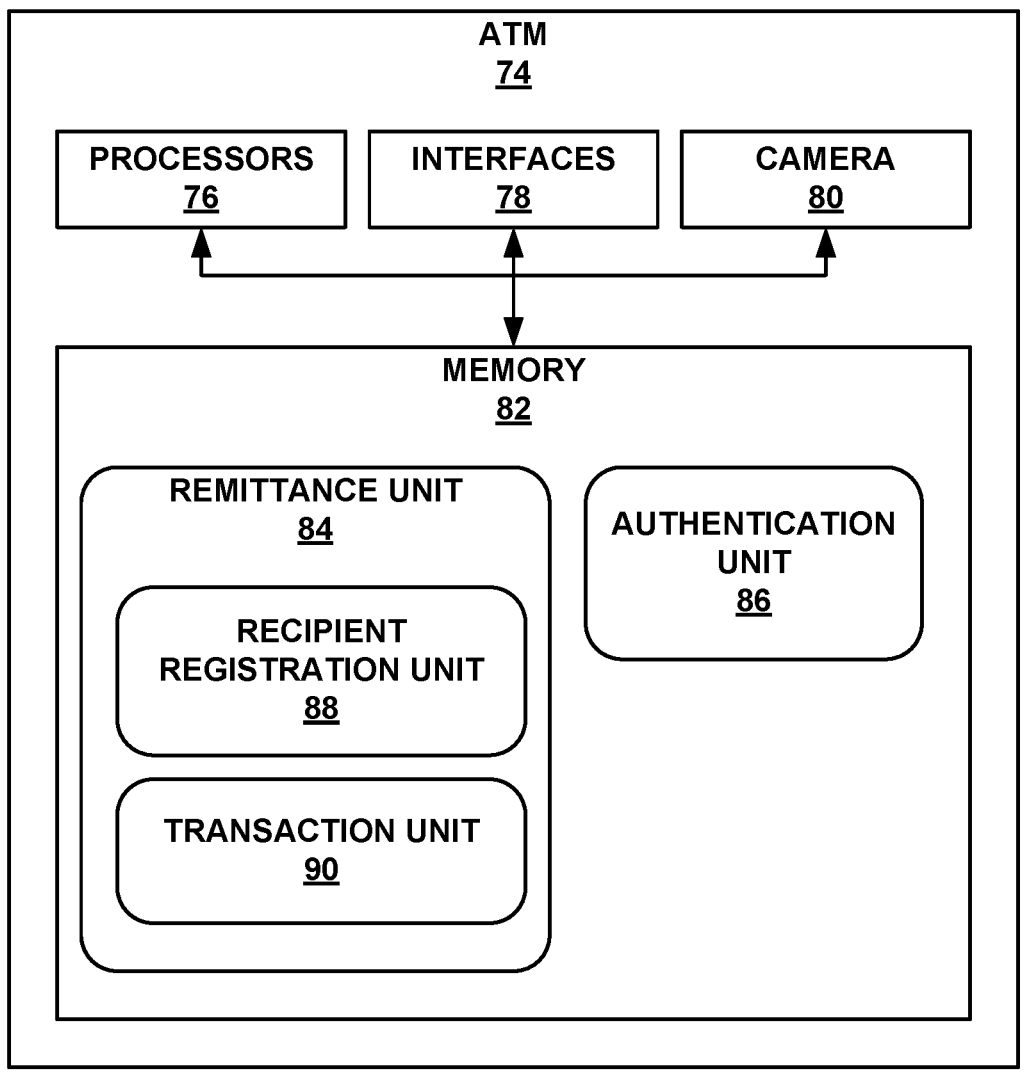
FIG. 4 is a block diagram illustrating an example ATM configured to perform sender authenticated remittance transactions for a recipient, in accordance with the techniques of this disclosure.

FIG. 4 is a block diagram illustrating an example ATM 74 configured to perform sender authenticated remittance transactions for a recipient, in accordance with the techniques of this disclosure. ATM 74 may operate substantially similar to ATM 14 from FIG. 1. For example, ATM 74 may communicate with remittance server 22 via network 12 from FIG. 1. The architecture of ATM 74 illustrated in FIG. 4 is shown for exemplary purposes only and ATM 74 should not be limited to this architecture. In other examples, ATM 74 may be configured in a variety of ways.

As shown in the example of FIG. 4, ATM 74 includes one or more processors 76, one or more interfaces 78, a camera 80, and one or more memory units 82. Memory 82 of ATM 74 includes remittance unit 84 and database 92, which are executable by processors 76. Each of the components, units, or modules of ATM 74 are coupled (physically, communicatively, and/or operatively) using communication channels for inter-component communications. In some examples, the communication channels may include a system bus, a network connection, an inter-process communication data structure, or any other method for communicating data.

Processors 76, in one example, may include one or more processors that are configured to implement functionality and/or process instructions for execution within ATM 74. For example, processors 76 may be capable of processing instructions stored by memory 82. Processors 76 may include, for example, microprocessors, DSPs, ASICs, FPGAs, or equivalent discrete or integrated logic circuitry, or a combination of any of the foregoing devices or circuitry.

ATM 74 may utilize interfaces 78 to communicate with external devices via one or more networks, e.g., network 12 from FIG. 1, or via wireless signals. Interfaces 78 may be network interfaces, such as Ethernet interfaces, optical transceivers, RF transceivers, or any other type of devices that can send and receive information. Other examples of interfaces may include Wi-Fi, NFC, or Bluetooth radios. In some examples, ATM 74 utilizes interfaces 78 to wirelessly communicate with an external device such as remittance server 22 from FIG. 1.

Camera 80 is configured to capture a picture of a recipient at ATM 74. Camera 80 may be any camera capable of capturing a still image. In some examples, camera 80 is embedded in ATM 74. In other examples, camera 80 is securely attached to ATM 74.

Camera 80 may be positioned to capture a picture of a recipient's face at ATM 74. Camera 80 may include a large frame size to capture a picture of a recipient's face for recipients of various heights. Additionally, or alternatively, camera 80 may be able to zoom and/or move in order to capture a picture of the recipient's face. Camera 80 and/or ATM 74 may include a motion sensor to detect where the recipient's face is located to capture the picture. Camera 80 may or may not include a flash. In examples in which camera 80 includes a flash, camera 80 may be configured to detect the amount of ambient light and turn the flash on if needed.

Memory 82 may be configured to store information within ATM 74 during operation. Memory 82 may include a computer-readable storage medium or computer-readable storage device. In some examples, memory 82 includes one or more of a short-term memory or a long-term memory. Memory 82 may include, for example, RAM, DRAM, SRAM, magnetic discs, optical discs, flash memories, or forms of EPROM, or EEPROM. In some examples, memory 82 is used to store program instructions for execution by processors 76. Memory 82 may be used by software or applications running on ATM 74 (e.g., remittance unit 84 or authentication unit 86) to temporarily store information during program execution.

ATM 74 may have a location identifier, such as an identification number or other identification information, associated with ATM 74 and may be sent by ATM 74 to a remittance server, e.g., remittance server 22 from FIG. 1. The location identifier may contain information about ATM 74 such as location data of ATM 74 and currency data for ATM 74 based on the location of ATM 74. For example, the location data may be information used to determine a location of ATM 74 including, for example, geographic coordinates associated with ATM 74 and/or other suitable location information associated with ATM 74. Currency data may be information used to determine one or more currencies associated with a particular location. For example, a remittance server may receive the location identifier from ATM 74 and use the location and/or currency data to determine one or more currencies associated with the location data; a country, a city, or other geographic region; and/or other suitable location information.

Remittance unit 84 is configured to facilitate remittance transactions between a sender computing device, e.g., sender computing device 48 from FIG. 3, and ATM 74. Remittance unit 84 includes recipient registration unit 88 and transaction unit 90. Remittance unit 84 may facilitate recipient registration and sender- or recipient-initiated remittance transactions.

Recipient registration unit 88 is configured to facilitate registration of recipients, in accordance with the techniques of this disclosure. In some examples, recipient registration unit 88 may present a user interface with a function allowing a user to register with a sender. In other examples, recipient registration unit 88 may prompt every user if he or she would like to register for remittance transactions. If recipient registration unit 88 receives input that the user would like to register, recipient registration unit 88 may then prompt the user to enter a URN. Upon receipt of the URN, recipient registration unit 88 may send the URN to a remittance server for verification.

Recipient registration unit 88 may receive a denial notification from the remittance server and display a notification that the registration request is denied, or recipient registration unit 88 may receive an approval notification from the remittance server and display a notification that a picture will be taken. Recipient registration unit 88 may display instructions, such as where to look for the picture to be taken, if any additional buttons or keys need to be pressed, and/or how much time will pass prior to the picture being taken. Camera 80 takes the picture of the user in response to instructions from recipient registration unit 88.

In some examples, recipient registration unit 88 may prompt the user to approve the picture. Recipient registration unit 88 sends the picture to the remittance server for verification. Recipient registration unit 88 may display a message that there may be a waiting period before continuing with the registration while waiting for verification. Recipient registration unit 88 may receive a verification or a denial notification from the remittance server. If a denial notification is received, recipient registration unit 88 may display a notification that the registration request is denied. If recipient registration unit 88 denies a registration request at any point during the registration process, recipient registration unit 88 may present an option to the user to begin the registration process from the beginning, e.g., in the case that human error prevented the registration from being able to be completed.

If recipient registration unit 88 receives a verification notification from the remittance server, recipient registration unit 88 may display a notification that the registration process has been successfully completed. Recipient registration unit 88 may then present an option for the user to initiate a remittance transaction request.

In some examples, transaction unit 90 prompts every user if he or she would like to initiate a remittance transaction request or accept a sender-initiated remittance transaction. In other examples, the user may use a display or keypad on ATM 74 to initiate a remittance request or accept a remittance transaction. Transaction unit 90 prompts the user to enter a sender's identifying information. In the case in which the remittance request is recipient-initiated, transaction unit 90 may also prompt the user to enter a remittance amount and/or the sender's country of residence. Additionally, or alternatively, transaction unit 90 may allow the user to select a remittance transaction amount limit. If a currency exchange needs to be completed, e.g., in the case where the user and sender reside in different countries, transaction unit 90 may convert the remittance amount in the user's currency to the amount in the sender's currency using the currency data stored in database 92. In some examples, ATM 74 may display the amount requested in local currency (of the user) as well as the amount in the sender's currency for user approval. Transaction unit 90 may send the sender's identifying information, and optionally, the remittance amount, to the remittance server.

Transaction unit 90 may instruct camera 80 to take a picture of the user in accordance with the techniques of the disclosure. Camera 80 may send the captured picture to the remittance server for verification. In some examples, transaction unit 90 prompts the user to approve the picture prior to sending the remittance transaction request to the remittance server and may notify the user that there may be a waiting period before continuing the remittance transaction.

Transaction unit 90 may receive a verification notification, a denial notification, or an additional request from the remittance server. If a denial notification is received, transaction unit 90 may display a notification that the remittance transaction request is denied. If transaction unit 90 receives a verification notification from the remittance server, transaction unit 90 may facilitate delivery of funds in the remittance amount. Furthermore, transaction unit 90 may display a notification that the remittance transaction request has been approved and that the remittance funds will be delivered. Transaction unit 90 may deliver the funds in the remittance amount to the user, e.g., through a component configured to dispense cash.

If an additional request has been received by transaction unit 90, transaction unit 90 may prompt the user for the appropriate information. For example, if an additional picture was requested, transaction unit 90 may instruct camera 80 to take an additional picture of the user. In some examples, if the remittance amount was determined to be above a remittance transaction limit, transaction unit 90 may prompt the user to enter a different remittance amount. Transaction unit 90 may send the additional information to the remittance server for verification.

Moreover, if the sender made changes to the remittance request, such as made a change to the remittance amount, transaction unit 90 may prompt the user to accept the change. Then, transaction unit 90 may display a notification that the remittance transaction request has been approved and that the remittance funds will be delivered. Transaction unit 90 may deliver the remittance amount to the user.

Upon successful approval and completion of the remittance transaction, or upon denial of the remittance transaction, transaction unit 90 may send a notification of the outcome of the remittance transaction, e.g., that the remittance funds have been successfully delivered or that the remittance request has been successfully denied, to the remittance server.

Authentication unit 86 may access a data structure for storing data related to a financial institution, e.g., financial institution 24 from FIG. 1. Authentication unit 86 may access sender identifying information, sender financial data, and/or any other suitable data according to particular needs. The sender financial data may include financial data associated with one or more sender's identifying information. For example, for a particular sender's identifying information, e.g., a sender's phone number, the sender's financial data may include the sender's bank account data and/or any other suitable data associated with the sender's identifying information. For a given sender's identifying information, the sender's financial data may indicate any number of checking, savings, investment, or other types of accounts associated with the sender's identifying information. The sender's financial data may include current account balance data and/or historical account balance data for any number of accounts associated with the sender's identifying information. In some examples, the sender's financial data may be based on information generated within the financial institution. Authentication unit 86 may also use the information stored by the database to authenticate a user's PIN number, e.g., to perform financial transactions such as withdrawals or deposits. Authentication unit 86 may access the database stored at a financial institution's network, or it may be stored by any suitable party and in any suitable location according to particular needs. The database may be a single database, or may be any suitable number of databases may be used for storing the data described according to particular needs.

Figure 5:
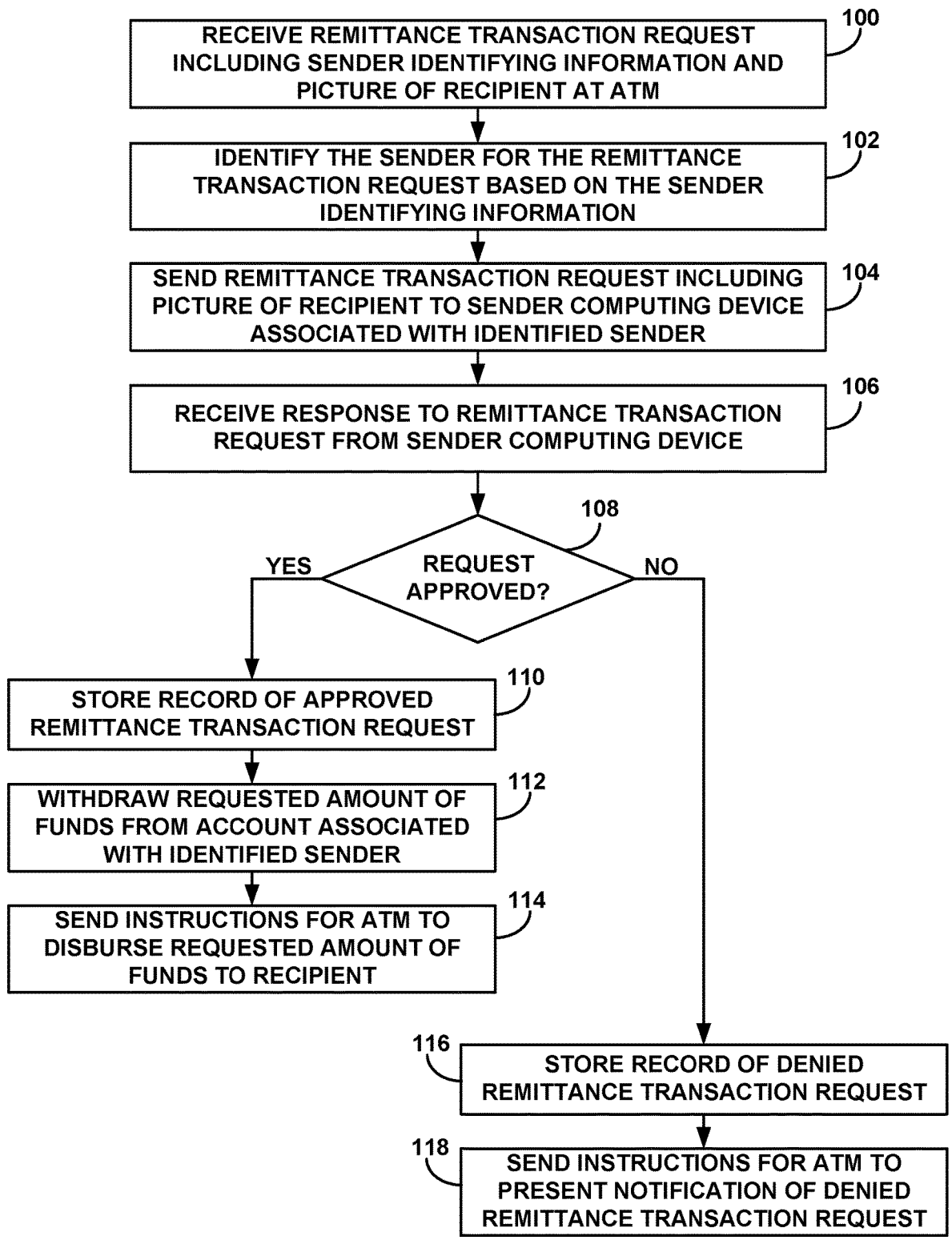
FIG. 5 is a flowchart illustrating an example operation of a remittance server performing a remittance transaction, in accordance with the techniques of this disclosure.

FIG. 5 is a flowchart illustrating an example operation of a remittance server performing a remittance transaction, in accordance with the techniques of this disclosure. The example operation of FIG. 5 will be described with respect to remittance server 22 included in money transfer system 10 of FIG. 1 for ease of description only. A person having ordinary skill in the art will recognize and appreciate that the example operation of FIG. 5 may also be performed by remittance server 26 of FIG. 2.

Remittance server 22 may receive a remittance transaction request including a sender's identifying information and a picture of a recipient from ATM 14 (100). In some examples, the remittance transaction request may also include the remittance amount requested. Remittance server 22 may identify the sender for the remittance transaction request based on the sender's identifying information (102). The sender may be identified using the sender profiles, e.g., sender profiles 46 from FIG. 2, stored on remittance server 22.

Remittance server 22 sends the remittance transaction request including the picture of the recipient to sender computing device 18 associated with the identified sender (104). In some examples, the remittance transaction request may further include the amount requested, any details contained in the recipient profile (if the recipient is registered), the location of ATM 14, or the like. Remittance unit 22 may receive a response to the remittance transaction request from sender computing device 18 (106). Remittance unit 22 may determine whether the response indicates approval or denial of the remittance transaction request (108). If remittance server 22 determines the response indicates approval of the remittance transaction (YES branch of 108), remittance server 22 may store a record of the approved remittance transaction request (110). The approved remittance transaction request may be stored in one of the recipient profiles stored on remittance server 22, e.g., recipient profiles 44 from FIG. 2. Remittance server 22 withdraws the requested amount of funds from one or more accounts associated with the identified sender (112). Remittance server 22 sends instructions to ATM 14 to disburse the requested amount of funds to the recipient (114).

If remittance server 22 determines the response indicates denial of the remittance transaction (NO branch of 108), remittance server 22 may store a record of the denied remittance transaction request (116). The denied remittance transaction request may be stored in one of the recipient profiles stored on remittance server 22, e.g., recipient profiles 44 from FIG. 2. Remittance server 22 may send instructions to ATM 14 to present a notification of the denied remittance transaction request to the recipient (118).

Figure 6:
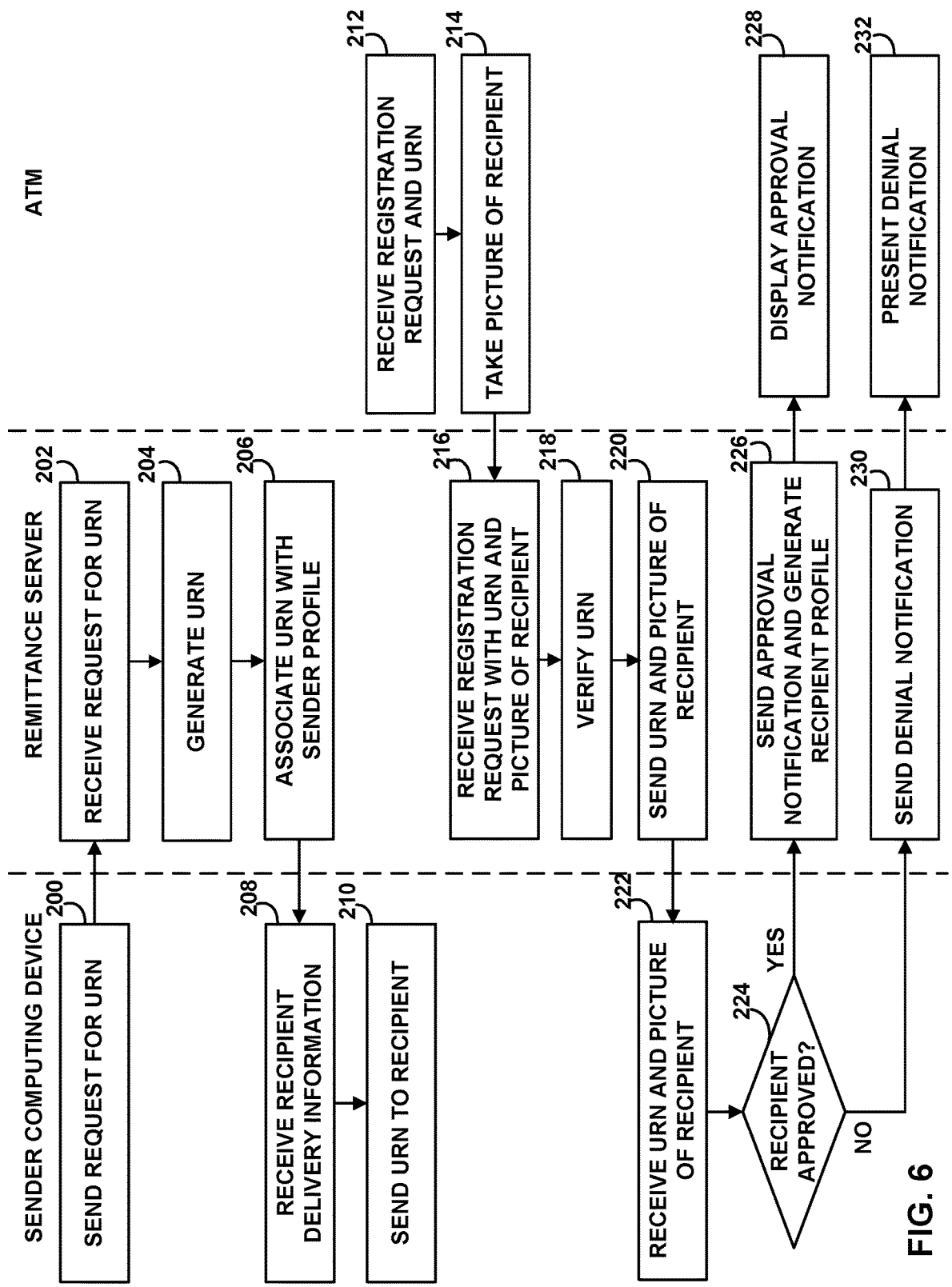
FIG. 6 is a flowchart illustrating an example operation of a recipient registration process performed by a money transfer system, in accordance with the techniques of this disclosure.

FIG. 6 is a flowchart illustrating an example operation of a recipient registration process performed by a money transfer system, in accordance with the techniques of this disclosure. The example operation of FIG. 6 will be described with respect to money transfer system 10 of FIG. 1 for ease of description only. A person having ordinary skill in the art will recognize and appreciate that the example operation of FIG. 6 may be performed by money transfer systems other than money transfer system 10 of FIG. 1. The example operation of FIG. 6 is described herein as being performed by sender computing device 18, remittance server 22, and ATM 14.

Sender computing device 18 may send a request to receive a URN for remittance server 22 (200). Remittance server 22 may receive the request for the URN from sender computing device 18 (202). Remittance server 22 may generate a URN (204). Remittance server 22 may associate the generated URN with a sender profile associated with sender computing device 18, e.g., in one sender profiles 46 from FIG. 2, stored on remittance server 22 (206).

Sender computing device 18 may receive information about the recipient from the sender including the recipient's name, address, phone number, email, or the like and a method of delivery for the URN to be delivered to the recipient (208). Sender computing device 18 may send the URN to the recipient (210). Sender computing device 18 may use the information about the recipient received in order to deliver the URN to the recipient. Sender computing device 18 may itself facilitate delivery of the URN to the recipient, or sender computing device 18 may send the delivery information to remittance server 22 such that delivery of the URN to the recipient may be facilitated by remittance server 22.

After the recipient has received the URN, the recipient may go to ATM 14 to complete the registration process. ATM 14 may receive a registration request including the URN from the recipient (212). ATM 14 may instruct camera 8 to take a picture of the recipient (214). ATM 14 may present instructions to the recipient, such as where to look for the picture to be taken, if any additional buttons or keys need to be pressed, and/or how much time will pass prior to the picture being taken. Then, the URN and recipient picture may be sent to remittance server 22 by ATM 14.

Remittance server 22 may receive the registration request including the URN and the picture of the recipient from ATM 14 (216). Remittance server 22 may verify the URN, in accordance with the techniques of the disclosure (218). For example, remittance server 22 may verify that the URN is associated with a sender and has not previously been used to register another recipient. If the URN is verified by remittance server 22, remittance server 22 sends the URN and the picture of the recipient to sender computing device 18 (220).

The sender computing device 18 may receive the URN and the picture of the recipient from remittance server 22 (222). Sender computing device 18 may prompt the sender to approve or deny the registration request including the URN and the picture of the recipient (224). The sender may also be able to perform other options, such as request additional information. If sender computing device 18 receives approval of the registration request (YES branch of 224), sender computing device 18 may send the approval to remittance server 22. Remittance server 22 then sends a notification approving the request to ATM 14 and generates a recipient profile, e.g., one of recipient profiles 44 from FIG. 2, for the newly registered recipient (226). ATM 14 may then display an approval notification to the recipient (228).

If sender computing device 18 receives denial of the registration request (NO branch of 224), sender computing device 18 may send the denial to remittance server 22. Remittance server 22 then sends a notification denying the request to ATM 14 (230). ATM 14 may then display a denial notification to the recipient (232).

Figure 7:
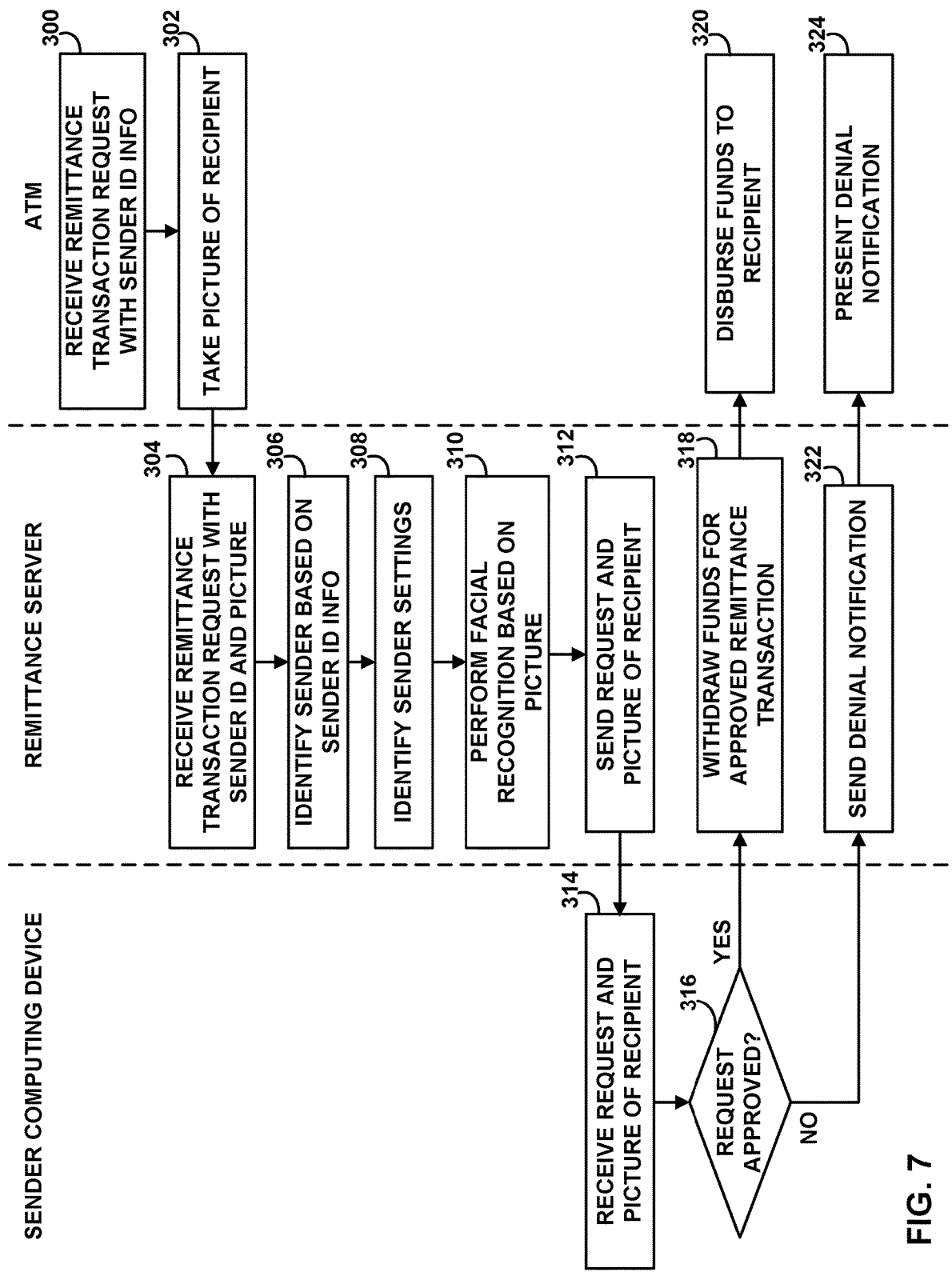
FIG. 7 is a flowchart illustrating an example operation of a remittance transaction process performed by a money transfer system, in accordance with the techniques of this disclosure.

FIG. 7 is a flowchart illustrating an example operation of a remittance transaction process performed by a money transfer system, in accordance with the techniques of this disclosure. The example operation of FIG. 7 will be described with respect to system 10 of FIG. 1 for ease of description only. A person having ordinary skill in the art will recognize and appreciate that the example operation of FIG. 7 may be used to form systems other than system 10 of FIG. 1. The example operation of FIG. 7 is described herein as being performed by sender computing device 18, remittance server 22, and ATM 14.

ATM 14 may receive a remittance transaction request including a sender's identifying information from a recipient using ATM 14 (300). In some examples, the remittance transaction request may further include an amount of money requested. ATM 14 may instruct camera 8 to take a picture of the recipient (302).

Remittance server 22 may receive the remittance transaction request including the sender's identifying information and the picture of the recipient from ATM 14 (304). In some examples, the remittance transaction request may also include the amount requested. Remittance server 22 may identify a sender based on the sender's identifying information (306). Remittance server 22 may use the sender profiles stored at remittance server 22 to identify the sender. Remittance server 22 may identify sender settings (308). The sender settings may include automatic approval or denial settings, notification settings, or any other settings in accordance with the aspects of the disclosure.

If the sender settings include only accepting remittance transaction requests from registered recipients, remittance server 22 may perform facial recognition based on the picture of the recipient (310). For example, remittance server 22 may compare the picture of the recipient at the ATM with pictures or image data of registered recipients stored in recipient profiles, e.g., recipient profiles 44 of FIG. 2, to verify that the recipient is a registered recipient associated with the identified sender. In some examples, the sender settings may include automatic approval or denial settings, in accordance with the aspects of the disclosure. In this example, remittance server 22 may automatically approve the remittance transaction request based on the sender settings, e.g., the recipient is verified as a registered recipient combined with other settings related to the requested amount or the time of day. If the remittance transaction request does not comply with the sender settings, e.g., the recipient is not a registered recipient, remittance server 22 may automatically deny the remittance transaction request. Remittance server 22 may send a notification to ATM 14 and/or sender computing device 18 regarding the automatically approved or denied transaction. If the remittance transaction request complies with the sender settings and the remittance transaction request has not been automatically approved or denied, remittance server 22 may send the remittance transaction request including the picture of the recipient, and optionally, the amount requested, to sender computing device 18 (312).

Sender computing device 18 may receive the remittance transaction request from remittance server 22 (314). Sender computing device 18 may prompt the sender to approve or deny the remittance transaction request including the URN and the picture of the recipient (316). The sender may also be able to perform other options, such as request additional information or change the remittance amount using sender computing device 18. Sender computing device 18 may communicate with remittance server 22 in order to request additional information, change the remittance amount, or the like, in accordance with the techniques of the disclosure. Remittance server 22 may then communicate with ATM 14 to obtain the additional information or inform the recipient of any changes made. The additional information and/or changes may result in remittance sever 22 obtaining verification or approval from the sender and/or the recipient prior to approving the remittance transaction request and notifying ATM 14 to deliver the remittance funds.

If sender computing device 18 receives approval of the remittance transaction request (YES branch of 316), sender computing device 18 may send the approval to remittance server 22. Remittance server 22 withdraws the requested amount of funds from one or more accounts associated with the identified sender (318). Remittance server 22 may send instructions to ATM 14 to disburse the requested amount of funds to the recipient. ATM 14 disburse the funds to the recipient (320).

If sender computing device 18 receives denial of the remittance transaction request (NO branch of 316), sender computing device 18 may send the denial to remittance server 22. Remittance server 22 may send instructions to ATM 14 to present a notification of the denied remittance transaction request to the recipient (322). ATM 14 may present a denial notification to the recipient (324).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computer-implemented method comprising:
receiving, by an input device of an automatic teller machine (ATM), user input from a recipient to request a remittance transaction between a sender and the recipient, wherein receiving the user input includes receiving sender identifying information and a requested amount of funds entered by the recipient via the input device of the ATM;
capturing, by a camera of the ATM, a picture of the recipient;
sending, by the ATM and to a server in communication with the ATM, a remittance transaction request including the sender identifying information, the requested amount of funds, and the picture of the recipient at the ATM;
receiving, by the server and from the ATM, the remittance transaction request to perform the remittance transaction between the sender and the recipient;
identifying, by the server and based on the sender identifying information included in the remittance transaction request, the sender for the remittance transaction;
sending, by the server and to a sender computing device associated with the identified sender, the remittance transaction request including the requested amount of funds and the picture of the recipient at the ATM;
receiving, by the server and from the sender computing device, a response to the remittance transaction request, wherein the sender's response comprises one of approval of the remittance transaction request, approval of an updated remittance transaction request, or denial of the remittance transaction request for the pictured recipient; and
when the sender's response comprises approval of the updated remittance transaction request for a modified amount of funds that is different than the requested amount of funds included in the remittance transaction request, the method further comprises:
sending, by the server, a notification to the ATM indicating the modified amount of funds for the recipient;
withdrawing, by the server, the modified amount of funds from an account associated with the identified sender;

sending, by the server and to the ATM, instructions for the ATM to perform the remittance transaction in accordance with the modified amount of funds indicated in the notification; and in response to receiving the instructions from the server, disbursing, by the ATM and to the recipient via a vending component of the ATM, the modified amount of funds.

2. The method of claim 1, when the sender's response to the remittance transaction request comprises approval of the remittance transaction request for the requested amount of funds for the recipient, the method further comprises:

storing, by the server, a record of the approved remittance transaction;

withdrawing, by the server, the requested amount of funds from the account associated with the identified sender; and sending instructions for the ATM to disburse the requested amount of funds to the recipient.

3. The method of claim 1, when the sender's response to the remittance transaction request comprises denial of the remittance transaction request for the requested amount of funds for the recipient, the method further comprises:

storing, by the server, a record of the denied remittance transaction request; and sending, by the server and to the ATM, instructions for the ATM to present a notification to the recipient that the remittance transaction is denied.

4. The method of claim 1, wherein the remittance transaction request comprises a recipient-initiated remittance transaction request.

5. The method of claim 1, further comprising, prior to sending the remittance transaction request to the sender computing device:

performing, by the server, facial recognition between the picture of the recipient at the ATM included with the remittance transaction request and a plurality of pictures of registered recipients stored in recipient profiles associated with the identified sender and maintained at the server; and based on a match between the picture of the recipient at the ATM and one of the pictures of registered recipients, determining, by the server, that the recipient at the ATM is the one of the registered recipients.

6. The method of claim 1, further comprising, prior to sending the remittance transaction request to the sender computing device:

identifying, by the server, one or more sender settings for remittance transactions, wherein the one or more sender settings include at least one of default sender settings stored in a sender profile for the identified sender and maintained at the server or recipient-specific sender settings stored in recipient profiles associated with the identified sender and maintained at the server; and determining, by the server, what action to take in response to the remittance transaction request based on the one or more identified sender settings.

7. The method of claim 1, further comprising, prior to sending the remittance transaction request to the sender computing device, determining, by the server, whether automatic approval settings apply to the remittance transaction request.

8. The method of claim 1, further comprising:

generating, by the server in response to a request from the sender computing device, a unique recipient number (URN);

associating, by the server, the URN with a sender profile maintained at the server for the identified sender;

receiving, by the server and from the ATM, a recipient registration request that includes the URN and a picture of the recipient at the ATM;

determining, by the server, that the URN is associated with the identified sender and that the URN has not previously been used for registration of another recipient;

sending, by the server, the recipient registration request including the picture of the recipient at the ATM to the sender computing device; and upon receiving approval of the recipient registration request for the recipient from the sender computing device, generating, by the server, a recipient profile associated with the identified sender and maintained at the server for the registered recipient.

9. The method of claim 8, further comprising storing, by the server and in the recipient profile for the registered recipient, the picture of the recipient at the ATM included with the recipient registration request.

10. A system comprising:

an automatic teller machine (ATM) comprising an input device, a camera, and a vending component, wherein the ATM is configured to:

receive user input from a recipient via the input device to request a remittance transaction between a sender and the recipient, wherein the user input includes sender identifying information and a requested amount of funds entered by the recipient via the input device;

capture a picture of the recipient via the camera; and send, to a server device in communication with the ATM, a remittance transaction request including the sender identifying information, the requested amount of funds, and the picture of the recipient at the ATM; and the server device comprising a memory configured to store a plurality of sender profiles and one or more programmable processors in communication with the memory and configured to:

receive, from the ATM, the remittance transaction request to perform the remittance transaction between the sender and the recipient;

identify, from the plurality of sender profiles and based on the sender identifying information included in the remittance transaction request, the sender for the remittance transaction;

send, to a sender computing device associated with the identified sender, the remittance transaction request including the requested amount of funds and the picture of the recipient at the ATM;

receive, from the sender computing device, a response to the remittance transaction request, wherein the sender's response comprises one of approval of the remittance transaction request, approval of an updated remittance transaction request, or denial of the remittance transaction request for the pictured recipient; and when the sender's response comprises approval of the updated remittance transaction request for a modified amount of funds that is different than the requested amount of funds included in the remittance transaction request, the one or more programmable processors of the server device are configured to:

send a notification to the ATM indicating the modified amount of funds for the recipient, withdraw the modified amount of funds from an account associated with the identified sender, and send, to the ATM, instructions for the ATM to perform the remittance transaction in accordance with the modified amount of funds indicated in the notification, wherein the ATM is further configured to, in response to receipt the instructions from the server device, disburse, to the recipient via the vending component, the modified amount of funds.

11. The system of claim 10, wherein, when the sender's response to the remittance transaction request comprises approval of the remittance transaction request for the requested amount of funds for the recipient, the one or more programmable processors of the server device are configured to:

store a record of the approved remittance transaction request;

withdraw the requested amount of funds from the account associated with the identified sender; and send instructions for the ATM to disburse the requested amount of funds to the recipient.

12. The system of claim 10, wherein, when the sender's response to the remittance transaction request comprises denial of the remittance transaction request for the requested amount of funds for the recipient, the one or more programmable processors of the server device are configured to:

store a record of the denied remittance transaction request; and send, to the ATM, instructions for the ATM to present a notification to the recipient that the remittance transaction request is denied.

13. The system of claim 10, wherein the remittance transaction request comprises a recipient-initiated remittance transaction request.

14. The system of claim 10, wherein the one or more programmable processors of the server device are configured to, prior to the remittance transaction request being sent to the sender computing device:

perform facial recognition between the picture of the recipient at the ATM included with the remittance transaction request and a plurality of pictures of registered recipients stored in recipient profiles associated with the identified sender and maintained at the server; and determine, based on a match between the picture of the recipient at the ATM and one of the pictures of registered recipients, that the recipient at the ATM is the one of the registered recipients.

15. The system of claim 10, wherein the one or more programmable processors of the server device are configured to, prior to sending the remittance transaction request to the sender computing device:

identify one or more sender settings for remittance transactions, wherein the one or more sender settings include at least one of default sender settings stored in a sender profile for the identified sender and maintained at the server or recipient-specific sender settings stored in recipient profiles associated with the identified sender and maintained at the server; and determine what action to take in response to the remittance transaction request based on the one or more identified sender settings.

16. The system of claim 10, wherein the one or more programmable processors of the server device are configured to, prior to sending the remittance transaction request to the sender computing device, determine whether automatic approval settings apply to the remittance transaction request.

17. The system of claim 10, wherein the one or more programmable processors of the service device are configured to:

generate, in response to a request from the sender computing device, a unique recipient number (URN);

associate the URN with a sender profile for the identified sender from the plurality of sender profiles stored in the memory of the server device;

receive, from the ATM, a recipient registration request that includes the URN and a picture of the recipient at the ATM;

determine that the URN is associated with the identified sender and that the URN has not previously been used for registration of another recipient;

send the recipient registration request including the picture of the recipient at the ATM to the sender computing device; and generate, upon receiving approval of the recipient registration request for the recipient from the sender computing device, a recipient profile for the registered recipient that is associated with the identified sender and stored in the memory of the server device.

18. The system of claim 17, wherein the one or more programmable processors of the server device are configured to store, in the recipient profile for the registered recipient, the picture of the recipient at the ATM included with the recipient registration request.

19. The system of claim 10, wherein the sender computing device comprises a display device, and one or more programmable processors in communication with the display device and configured to:

receive, from the server device, the remittance transaction request from the server device including the requested amount of funds and the picture of the recipient at the ATM, present, to the identified sender via the display device, a user interface including the requested amount of funds and the picture of the recipient at the ATM;

receive data via the user interface indicating a response to the remittance transaction request from the identified sender, wherein the sender's response comprises one of approval or denial of the remittance transaction for the pictured recipient, and send the response to the remittance transaction request back to the server device.

20. The system of claim 10, wherein the one or more programmable processors of the sender computing device are configured to:

send a request for a unique recipient number (URN) for the recipient to the server device; and upon receipt of the URN from the server device, send the URN to the recipient for use in registering with the identified sender for remittance transactions.

21. The system of claim 10, wherein the ATM is configured to:

receive a unique recipient number (URN) input by the recipient via the input device of the ATM;

send a recipient registration request including the URN and a picture of the recipient taken by the ATM to the server device; and upon receiving a notification from the server device that the recipient is a registered recipient, prompt the recipient at the ATM for information to generate the remittance transaction request.

* * * * *